United States Patent
Miura et al.

(10) Patent No.: US 8,506,433 B2
(45) Date of Patent: Aug. 13, 2013

(54) CONTINUOUSLY VARIABLE TRANSMISSION

(75) Inventors: Yoshitaka Miura, Yokohama (JP); Masashi Yoshino, Yamato (JP); Yoshiko Mineta, Sagamihara (JP); Akihiko Iwasaki, Machida (JP); Yuki Matsushita, Ebina (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 275 days.

(21) Appl. No.: 12/934,202

(22) PCT Filed: Mar. 17, 2009

(86) PCT No.: PCT/JP2009/055147
§ 371 (c)(1),
(2), (4) Date: Sep. 23, 2010

(87) PCT Pub. No.: WO2009/119380
PCT Pub. Date: Oct. 1, 2009

(65) Prior Publication Data
US 2011/0053717 A1    Mar. 3, 2011

(30) Foreign Application Priority Data

| Mar. 26, 2008 | (JP) | 2008-079530 |
| Jun. 4, 2008 | (JP) | 2008-146756 |
| Jan. 29, 2009 | (JP) | 2009-017811 |

(51) Int. Cl.
*F16H 55/56* (2006.01)
(52) U.S. Cl.
USPC .......................................................... 474/46
(58) Field of Classification Search
USPC .................. 474/49, 54, 55, 56, 79
See application file for complete search history.

(56) References Cited

U.S. PATENT DOCUMENTS

| 2,161,913 | A * | 6/1939 | Doyle ......................... 474/163 |
| 4,515,576 | A | 5/1985 | Wiens |
| 6,575,856 | B2 * | 6/2003 | Anderson ....................... 474/83 |
| 6,955,620 | B2 * | 10/2005 | Anderson ....................... 474/17 |
| 2003/0166426 | A1 | 9/2003 | Anderson |
| 2004/0038763 | A1 * | 2/2004 | Serkh ............................ 474/54 |
| 2010/0044179 | A1 * | 2/2010 | Nakamura et al. ........... 192/58.2 |

FOREIGN PATENT DOCUMENTS

| CN | 2299964 Y | 12/1998 |
| EP | 1 072 818 A1 | 1/2001 |
| GB | 356196 | 9/1931 |
| JP | 61-82061 A | 4/1986 |
| JP | 61082061 A * | 4/1986 |
| JP | 63-120950 A | 5/1988 |
| JP | 2001-41300 A | 2/2001 |
| WO | WO 03/001084 A1 | 1/2003 |

* cited by examiner

*Primary Examiner* — William E Dondero
*Assistant Examiner* — Diem Tran
(74) *Attorney, Agent, or Firm* — Foley & Lardner LLP

(57) ABSTRACT

A continuously variable transmission configured to transmit a rotational driving force of one pulley to another pulley by a driving-force transmitting means wound between the two pulleys, wherein each of the two pulleys is configured to vary a groove width thereof, the continuously variable transmission including: an engagement-receiving portion provided to the driving-force transmitting means, in a side of the driving-force transmitting means on which the driving-force transmitting means is wound on the pulleys; and a movable engaging portion provided to a shaft portion of at least one of the two pulleys, wherein the movable engaging portion is movable in a radial direction of the shaft portion to protrude from and escape into the shaft portion, wherein the movable engaging portion is configured to protrude from the shaft portion so as to engage with the engagement-receiving portion at least one of when a pulley-ratio region is in a setting for highest speed and when the pulley-ratio region is in a setting for lowest speed.

14 Claims, 25 Drawing Sheets

SETTING FOR HIGHEST SPEED

SETTING FOR LOWEST SPEED

| CHAIN: C<br>TEETH: T<br>CONDITION | C-T<br>CONTACT | C: RIDING<br>T: SINKING | C-T<br>ENGAGEMENT | CHAIN SLIP<br>SUPPRESSION |
|---|---|---|---|---|
| (A) | × | × | × | × |
| (B) | ○ | ○ | × | × |
| (C) | ○ | ○ | × | △ |
| (D) | ○ | △ | ○ | ○ |

# CONTINUOUSLY VARIABLE TRANSMISSION

TECHNICAL FIELD

The present invention relates to a continuously variable transmission (CVT). More particularly, the present invention relates to a continuously variable transmission in which teeth provided to a pulley are engaged with a driving-force transmitting means for transmitting driving force, during an operation of the continuously variable transmission.

BACKGROUND ART

As a continuously variable transmission for transmitting rotational driving force by a V-belt, for example, a conventional "continuously-variable transmitting mechanism" (see Patent Document 1) is known. According to this conventional "continuously-variable transmitting mechanism", a V-belt type continuously-variable transmitting mechanism transmits a rotational driving force between a pulley provided to a rotational drive shaft and a pulley provided to a rotational driven shaft by means of a V-belt, and at least one of these two pulleys is a pitch-variable pulley. Moreover, this V-belt type continuously-variable transmitting mechanism is characterized in that the V-belt includes its teeth and in that the pitch-variable pulley includes a gear for meshing with the teeth of V-belt at a bottom of V-groove.

Patent Document 1: Japanese Patent Application Publication No. 63-120950

SUMMARY OF THE INVENTION

However, in the conventional "continuously-variable transmitting mechanism", the gear which is installed in the pitch-variable pulley at the bottom of V-groove and which engages with the teeth of V-belt is fastened to the shaft at the bottom of V-groove. Hence, when the teeth fastened to the shaft at the bottom of V-groove is not sufficiently engaging with the teeth of V-belt, a pitch of teeth of V-belt deviates from a pitch of teeth of the gear. At this time, it is inevitable that the teeth included in the shaft attack the V-belt.

That is, a coordinated action between the teeth (i.e., an engaging means) installed to the shaft at the V-groove bottom of pitch-variable pulley and a driving-force transmitting means (V-belt, chain or the like) for transmitting driving force by engaging with the teeth of shaft is inhibited. Thereby, there is a possibility that a transfer of driving force becomes unable to be performed and the driving-force transmitting means is damaged.

It is an object of the present invention to provide a continuously variable transmission, in which the engaging means provided to the shaft at the V-groove bottom of pulley does not attack the driving-force transmitting means for transmitting driving force by engaging the engaging means and in which the coordinated action between the driving-force transmitting means and the engaging means is not inhibited.

According to the present invention, there is provided a continuously variable transmission characterized in that a movable engaging portion is configured to protrude from a shaft portion of pulley so as to engage with an engagement-receiving portion of driving-force transmitting means at least one of when a pulley-ratio region is in a setting for highest speed and when the pulley-ratio region is in a setting for lowest speed, i.e., at least one of when a pulley ratio takes a value of highest shift region and when the pulley ratio takes a value of lowest shift region.

According to the present invention, the movable engaging portion protrudes from the shaft portion of pulley so as to engage with the engagement-receiving portion of driving-force transmitting means, at least one of when the pulley-ratio region in the continuously variable transmission is in the setting for highest speed and when the pulley-ratio region is in the setting for lowest speed. Therefore, the engaging means provided in the shaft at a bottom of V-groove of pulley does not attack the driving-force transmitting means for transmitting driving force by engaging with the engaging means, and also, an action coordinated between the engaging means and the driving-force transmitting means is not inhibited.

DETAILED DESCRIPTION OF THE INVENTION

Figure 1:
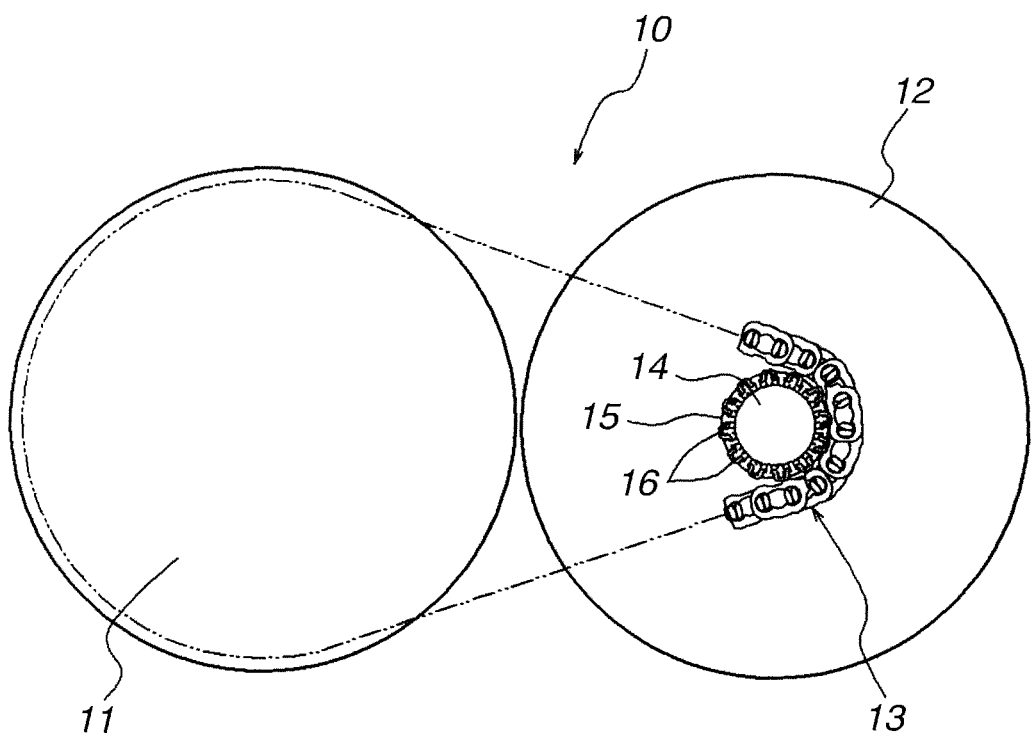
FIG. 1 A schematic explanatory view of a continuously variable transmission according to a first embodiment of the present invention.

Best mode for carrying out the present invention will be explained below referring to the drawings.

First Embodiment

FIG. 1 is a schematic explanatory view of a continuously variable transmission according to a first embodiment of the present invention. As shown in FIG. 1, the continuously variable transmission (CVT) 10 includes a drive pulley (primary pulley) 11, a driven pulley (secondary pulley) 12, and a driving-force transmitting means or medium 13. This driving-force transmitting means 13 is wound around (passed through) the drive pulley 11 and the driven pulley 12, between the drive pulley 11 and the driven pulley 12. Movable teeth (movable engaging portion) 16 are installed through a movable-teeth fixing component 15 to a shaft portion (pulley shaft) 14 of the driven pulley 12.

For example, the CVT 10 is provided in a vehicle, and can continuously vary a running speed of the vehicle (i.e., in stepless). According to this embodiment, a belt, a chain or the like can be employed as the driving-force transmitting means 13. Here, an example in which the chain is used as the driving-force transmitting means 13 will be explained.

A driving force derived from an engine (not shown) is inputted to the drive pulley 11. Then, a driving force outputted from the driven pulley 12 is transmitted to a driving shaft (not shown). In each of the drive pulley 11 and the driven pulley 12, a movable pulley moves relative to a fixed pulley so as to form a V-shaped groove (V-groove) in cross section between the fixed pulley and the movable pulley. A groove width of this V-groove can be varied by the movement of movable pulley. By continuously varying the V-groove width of drive pulley 11 which is on a driving side and by varying the V-groove width of driven pulley 12 which is on a driven side, a transmitting (winding) pitch of the chain 13 is varied in each of the driving and driven sides. Thereby, a smooth stepless shift can be attained.

Figure 2:
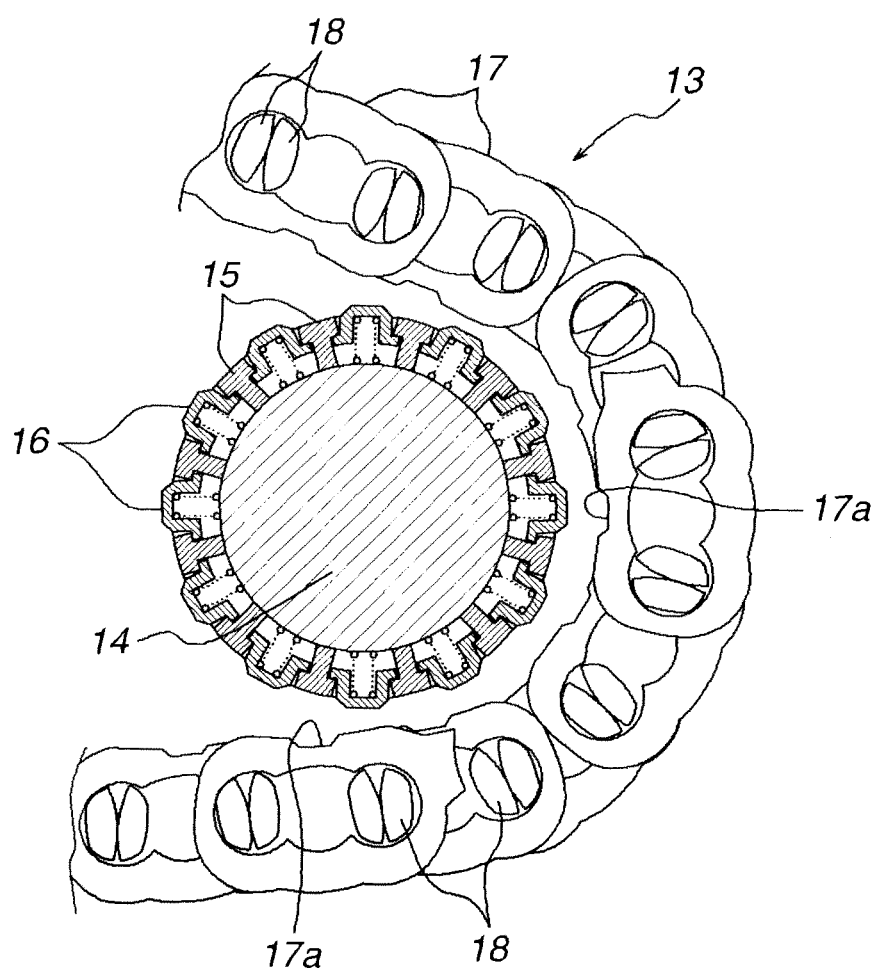
FIG. 2 An explanatory view showing a state where a chain has not been wound around a shaft portion of driven pulley of FIG. 1.
Figure 3:
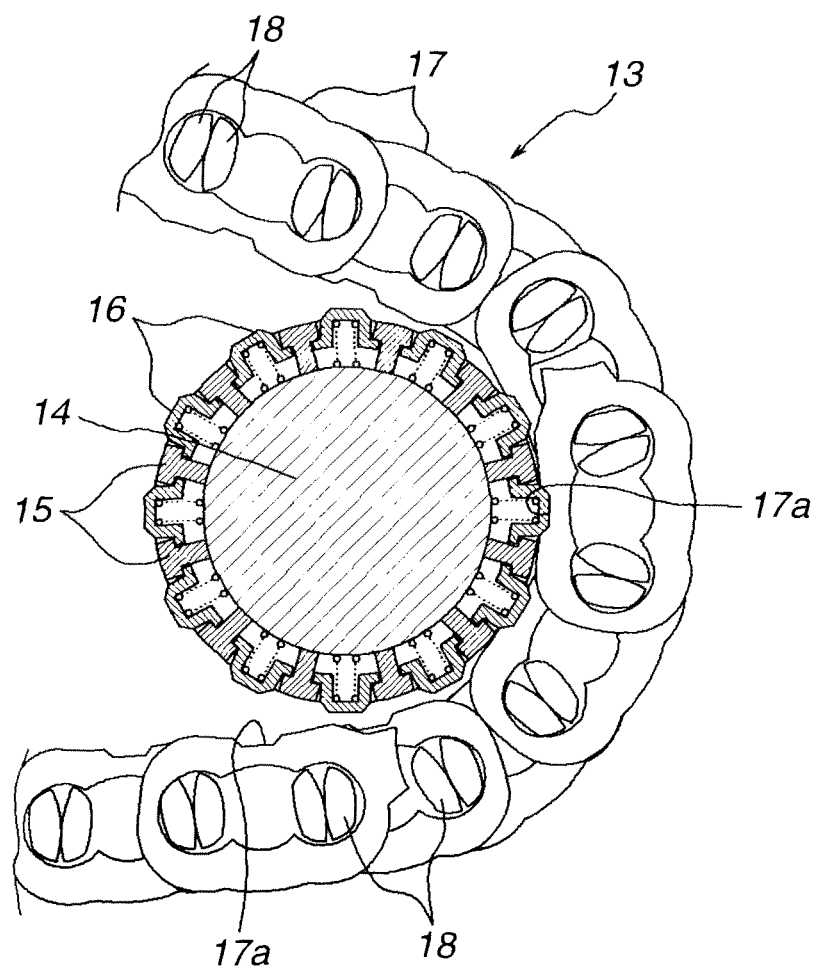
FIG. 3 An explanatory view showing a state where the chain has been wound around the shaft portion of driven pulley of FIG. 1.

FIG. 2 is an explanatory view showing a state where the chain has not been wound around the shaft portion of driven pulley of FIG. 1. FIG. 3 is an explanatory view showing a state where the chain has been wound around the shaft portion of driven pulley of FIG. 1.

As shown in FIGS. 2 and 3, the movable-teeth fixing component 15 is mounted on an outer circumferential surface of the shaft portion 14 of driven pulley 12. The movable teeth 16 are installed in an outer circumference of movable-teeth fixing component 15, over the entire circumferential range of movable-teeth fixing component 15. The movable teeth 16 protrude from a radially-outer surface of the movable-teeth fixing component 15, to be able to escape into the movable-teeth fixing component 15. That is, the movable teeth 16 are disposed in the movable-teeth fixing component 15 to allow the movable teeth 16 to move in a radial direction of movable-teeth fixing component 15. When the CVT 10 is under a state set for highest speed (for example, at the time of overdrive: OD), the movable teeth 16 protrude from the radially-outer surface of movable-teeth fixing component 15 and engage with the chain 13.

In this embodiment, the case where the movable teeth 16 are provided to the shaft portion 14 of driven pulley 12 is explained. However, according to the present invention, the movable teeth 16 may be provided to the drive pulley 11. In this case, the movable teeth 16 protrude from the radially-outer surface of movable-teeth fixing component 15 and engage with the chain 13, when the CVT 10 is under a state set for lowest speed.

That is, each movable tooth 16 protrudes from the radially-outer surface of movable-teeth fixing component 15 and engages with the chain 13, at least one of when the CVT 10 is under the state for highest speed and when the CVT 10 is under the state for lowest speed, namely, when the driving-force transmitting means (chain) 13 exists on a bottom of the V-groove of pulley.

The chain 13 includes chain links 17 each formed in a shape of thin-plate ring. The chain 13 is formed by connecting the chain links 17 with one another in an annular shape by means of multiple pairs of pins 18, under a state where the chain links 17 overlap with each other. Since the chain links 17 are connected with each other by using the pair of pins 18 serving as a connecting shaft, each chain link 17 rotates (swings) freely about the pair of pins 18 by using the pair of pins 18 as its rotation shaft. Each chain link 17 includes a concave portion (engagement-receiving portion) 17a, on a side of chain link 17 on which the chain links 17 are wound in contact with the movable teeth 16. Moreover, the concave portion 17a is located at a contact portion with the movable teeth 16. That is, the concave portion 17a is formed by cutting the chain link 17 in a shape corresponding to the protruding shape of movable tooth 16 which protrudes from the outer surface of shaft portion 14. The respective concave portions 17a are arranged at a pitch (interval) identical with the pitch (interval) between the adjacent movable teeth 16.

Figure 4:
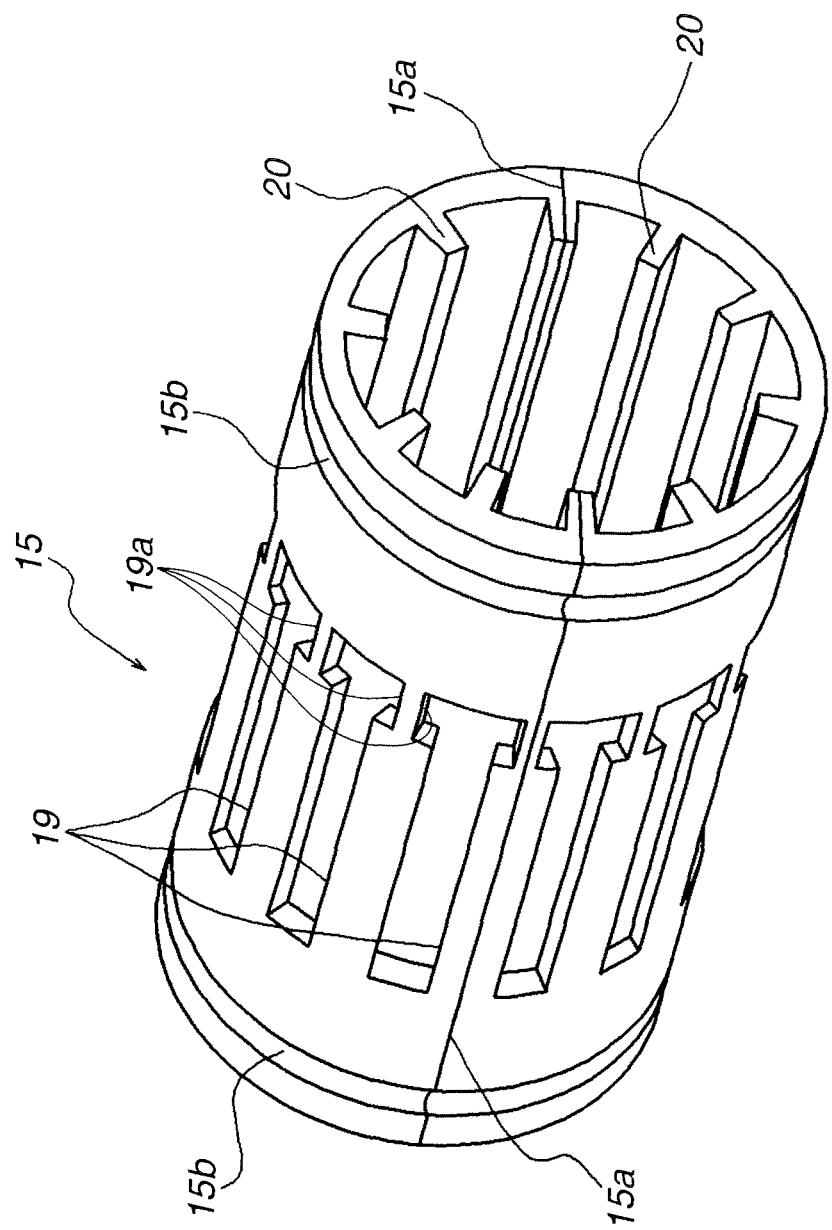
FIG. 4 An oblique perspective view of a movable-teeth fixing component to which movable teeth are mounted.

FIG. 4 is an oblique perspective view of the movable-teeth fixing component to which the movable teeth 16 are mounted. As shown in FIG. 4, the movable-teeth fixing component 15 is formed in a cylindrical (tubular) shape. The movable-teeth fixing component 15 includes a plurality of movable-teeth installation holes 19 for installing or fixing the movable teeth 16 in the circumferential surface of movable-teeth fixing component 15. This movable-teeth fixing component 15 can be divided into two pieces by division lines 15a extending along a central axis of the cylindrical shape, in order to attach the movable-teeth fixing component 15 to the outer surface of shaft portion 14 of driven pulley 12 in a buried state. Moreover, the movable-teeth fixing component 15 includes grooves 15b for arranging snap rings (not shown) therein, near both end portions of the circumferential surface, in order to fasten the movable-teeth fixing component 15 after attaching the divided two pieces of movable-teeth fixing component 15 to the shaft portion 14.

Each movable-teeth installation hole 19 passes through a circumferential wall of the movable-teeth fixing component 15, i.e., passes from a radially inner surface of the circumferential wall to a radially outer surface of the circumferential wall. Each movable-teeth installation hole 19 is formed in an elongate-hole shape which extends along the central axis of cylindrical movable-teeth fixing component 15 and which includes a width-broadening portion 19a at one end of movable-teeth installation hole 19. That is, each movable-teeth installation hole 19 is formed in a T shape in planer view. The respective movable-teeth installation holes 19 are provided in parallel with one another, to be spaced at approximately equal intervals in a circumferential direction of movable-teeth fixing component 15. The movable-teeth fixing component 15 includes partition-wall portions 20 projecting toward the central axis of cylindrical movable-teeth fixing component 15. Each partition-wall portion 20 is formed at a boundary portion between adjacent movable-teeth installation holes 19, and at an inner portion of movable-teeth fixing component 15. By virtue of these partition-wall portions 20, the circumferential wall of movable-teeth fixing component 15 projects toward the movable-teeth installation holes 19 in a flange shape, so that a radially-inner surface of the circumferential wall forms stepped surfaces (protrusion restricting portions) 20b (see FIG. 5). As a result, the stepped surfaces 20b are located on both sides of the movable-teeth installation hole 19.

Figure 5:
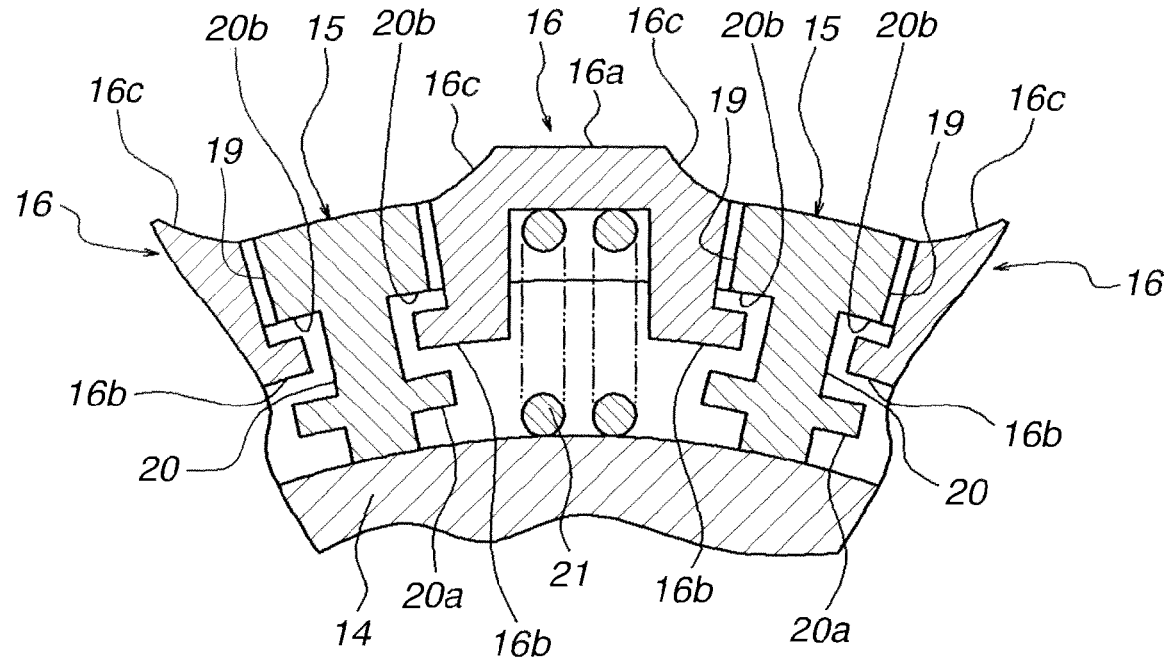
FIG. 5 An explanatory cross-sectional view showing an installation state under which the movable teeth are installed in the movable-teeth fixing component.

FIG. 5 is an explanatory cross-sectional view showing an installation state under which the movable teeth are installed in the movable-teeth fixing component. As shown in FIG. 5, each movable tooth 16 includes a protruding step portion 16a and stopping portions 16b. The protruding step portion 16a protrudes from the movable-teeth installation hole 19 when the movable tooth 16 has been installed into the movable-teeth fixing component 15. Moreover, the protruding step portion 16a extends in the axial direction of movable-teeth fixing component 15. The stopping portions 16b protrude outwardly in a flange shape, on both sides of bottom surface of the protruding step portion 16a. This movable tooth 16 may be formed in a box shape having an opening (recess) formed only in its lower surface. Alternatively, the movable tooth 16 may be formed in a shape of inverted U in cross section, i.e., in a shape having openings formed in its lower surface and also formed in its longitudinal both end sides.

Inclined surfaces 16c form edge portions of upper surface of the protruding step portion 16a. Namely, the inclined surfaces 16c form both side-edge portions of upper surface of protruding step portion 16a which are opposed to each other in the circumferential direction of movable-teeth fixing component 15, and form both side-edge portions of upper surface of protruding step portion 16a which are opposed to each other in the axial direction of movable-teeth fixing component 15. When the movable tooth 16 (the protruding step portion 16a) protrudes from the movable-teeth installation hole 19 (see FIG. 5), each inclined surface 16c comes to cooperate with the radially-outer surface of movable-teeth fixing component 15 to form a gentle inclination continuous between the inclined surface 16c and the radially-outer surface of movable-teeth fixing component 15. That is, an entire circumference (four sides of rectangle) of upper surface of protruding step portion 16a is constituted by the inclined surfaces 16c which have been formed so as to cut four edges of the upper surface of protruding step portion 16a.

Under the state where the movable tooth 16 is protruding from the movable-teeth installation hole 19; the movable tooth 16 has its protruding amount sufficient to engage with the concave portion 17a of chain 13 located at the bottom of V-groove of driven pulley 12, and also has its length in the axial direction of movable-teeth fixing component 15 which is sufficient to engage with the concave portion 17a.

This movable tooth 16 is mounted in the movable-teeth fixing component 15 under a compressed and biased state, by interposing a biasing member 21 such as a coil spring between the movable tooth 16 and the outer surface of shaft portion 14 of driven pulley 12. That is, when the movable tooth 16 is installed into the movable-teeth fixing component 15, the movable tooth 16 biased by the biasing member 21 causes the protruding step portion 16a to protrude from the outer surface of movable-teeth fixing component 15 (see FIG. 5). At this time, the movement of movable tooth 16 is restricted; since the stopping portions 16b become in contact with the stepped surfaces 20b of movable-teeth fixing component 15 from the radially-inner side, and thereby, the movement of movable tooth 16 is stopped. Hence, the movable tooth 16 is maintained under the state where only the inclined surfaces 16c of protruding step portion 16a are protruding from the radially-outer surface of movable-teeth fixing component 15.

When this movable tooth 16 is installed into the movable-teeth fixing component 15, the movable tooth 16 is introduced into one of the two pieces of movable-teeth fixing component 15 which have been divided by the division lines 15a extending in the axial direction, from the radially-outer surface side of movable-teeth fixing component 15 through the width-broadening portion 19a. Then, the protruding step portion 16a is inserted into the movable-teeth installation hole 19 from the radially-inner side, and then, the movable-teeth fixing component 15 is mounted in the outer surface of shaft portion 14 in the buried state, while disposing the biasing member 21 inside the protruding step portion 16a. In the same manner, the protruding step portions 16a are inserted into the movable-teeth installation holes 19 of another of the two pieces of movable-teeth fixing component 15. Then, the another of the two pieces of movable-teeth fixing component 15 is combined with the one of the two pieces of movable-teeth fixing component 15 in a shape of cylindrical tube and is mounted in the outer surface of shaft portion 14 in the buried state, while disposing the biasing member 21 inside the protruding step portion 16a.

The movable tooth 16 disposed under the state where the protruding step portion 16a has been inserted into the movable-teeth installation hole 19 is supported without falling (dropping) out from the movable-teeth installation hole 19 toward the inner side of movable-teeth fixing component 15, by means of stopping portions 20a (see FIG. 5, the illustration of stopping portion 20a will be omitted from the drawings other than FIG. 5) formed at the partition-wall portions 20 of inner portion of movable-teeth fixing component 15. The stopping portion 20a is formed at a location causing a space between the stopping portion 20a and the stepped surface 20b of movable-teeth fixing component 15 to allow the inclined surfaces 16c of protruding step portion 16a to completely escape into the inside of movable-teeth installation hole 19. That is, the location of stopping portions 20a is set to enable the inclined surfaces 16c of protruding step portion 16a to retract fully into the movable-teeth installation hole 19.

Figure 6A:
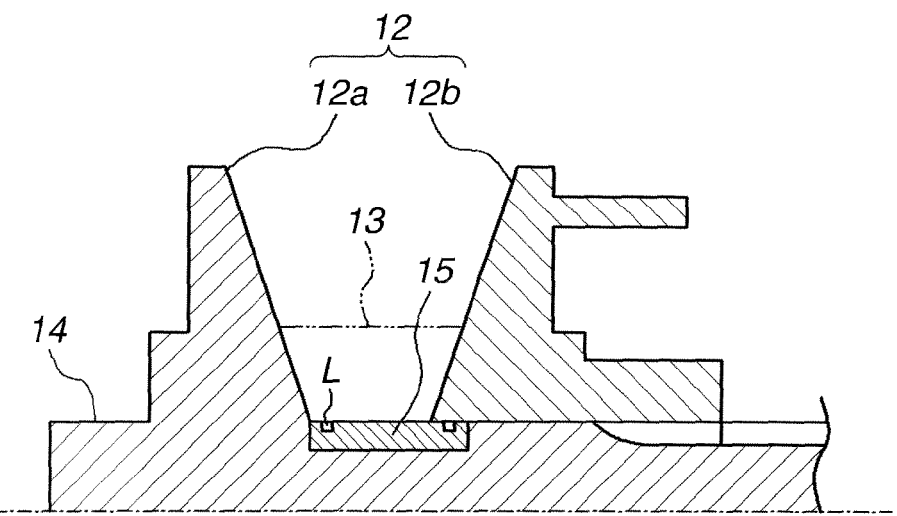
FIG. 6A An explanatory cross-sectional view showing a state in which the movable-teeth fixing component has been mounted in the shaft portion of driven pulley at the time of setting for highest speed.
Figures 6B, 7:
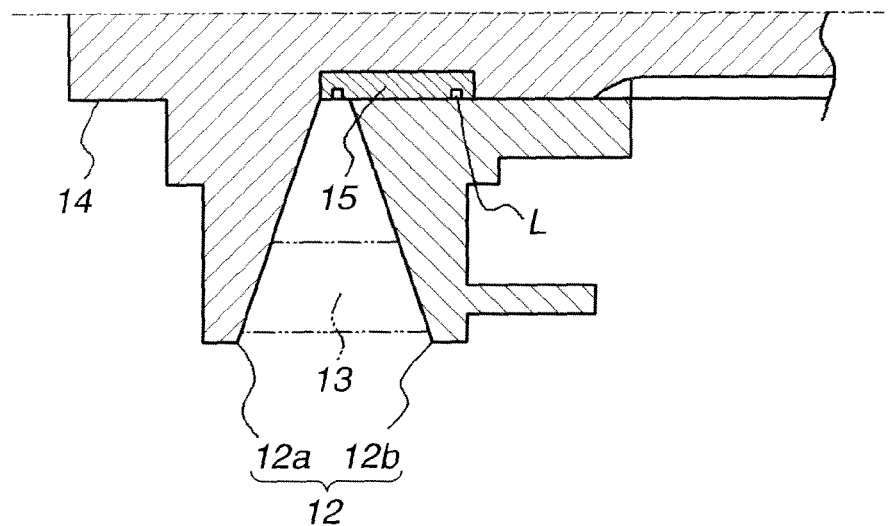
FIG. 6B An explanatory cross-sectional view showing a state in which the movable-teeth fixing component has been mounted in the shaft portion of driven pulley at the time of setting for lowest speed.
FIG. 7 An explanatory table showing respective states based on a relation between the chain and the movable teeth.

Afterward, the moveable-teeth fixing component 15 is fastened to the outer circumference of shaft portion 14 of driven pulley 12 in sa shape of cylindrical tube, by attaching the snap rings L to the grooves 15b (see FIGS. 6A and 6B). Thus, the shaft portion 14 is integrated with the moveable-teeth fixing component 15 into which the moveable teeth 16 have been installed. Since the moveable-teeth fixing component 15 is buried in the outer circumferential portion of shaft portion 14, the (radially-) outer surface of moveable-teeth fixing component 15 is flush with the (radially-) outer surface of the shaft portion 14 (see FIGS. 6A and 6B). That is, the outer surface of moveable-teeth fixing component 15 cooperates with the outer surface of the shaft portion 14 to define a same-level surface continuous between the moveable-teeth fixing component 15 and the shaft portion 14.

FIGS. 6A and 6B show the state in which the movable-teeth fixing component has been mounted in the shaft portion of driven pulley. FIG. 6A is an explanatory cross-sectional view at the time of setting for highest speed. FIG. 6B is an explanatory cross-sectional view at the time of setting for lowest speed. As shown in FIG. 6A, the driven pulley 12 places the movable pulley 12b away from the fixed pulley 12a so that the chain 13 is located at the bottom portion of V-groove, when the CVT 10 is in the setting for highest speed. On the other hand, as shown in FIG. 6B, the driven pulley 12 places the movable pulley 12b close to the fixed pulley 12a so that the chain 13 is located at an upper portion of V-groove, when the CVT 10 is in the setting for lowest speed. When the CVT 10 is in the setting for highest speed, namely when the chain 13 is placed at the bottom of V-groove because of the enlargement of V-groove width of driven pulley 12 so that a winding radius at which the chain 13 is wound around the driven pulley 12 is small; the chain 13 becomes in contact with the shaft portion of driven pulley 12. Thereby, the concave portion 17a of chain 13 engages with the movable tooth 16 protruding from the movable-teeth installation hole 19 of movable-teeth fixing component 15.

The movable pulley 12b which slides in contact with the (radially-) outer surface of shaft portion 14 along the outer surface of shaft portion 14 slides also in contact with the outer surface of movable-teeth fixing component 15. At this time, the movable pulley 12b moves while pushing down the protruding step portions 16a each having the inclined surfaces, against the biasing force of biasing members 21. Hence, the movable teeth 16 protruding from the movable-teeth installation holes 19 are made to escape (retract) into the movable-teeth installation holes 19. Therefore, the movement of movable pulley 12b is not prevented by the movable teeth 16 because of this retracted state inside the movable-teeth installation holes 19.

Next, operations of the CVT 10 including the above-explained structures will now be explained.

FIG. 7 is an explanatory table showing respective states based on the relation between the chain and the movable teeth. As shown in FIG. 7, a state where the chain 13 is in contact with the movable teeth 16 (C-T contact) is denoted by sign ◯, and on the other hand, a state where the chain 13 is not in contact with the movable teeth 16 is denoted by sign X. Next, a state where the chain 13 is riding on the movable teeth 16 so that the movable teeth 16 are sinking down (C: riding-T: sinking) is denoted by sign ◯, and on the other hand, a state where the chain 13 is not riding on the movable teeth 16 so that the movable teeth 16 are not sinking down is denoted by sign X. Next, a state where the chain 13 is engaging or meshing with the movable teeth 16 (C-T engagement) is denoted by sign ◯, and on the other hand, a state where the chain 13 is not engaging with the movable teeth 16 is denoted by sign X. Moreover, a state where the slip of chain 13 is being suppressed (C: slip suppression) is denoted by sign ◯, and on the other hand, a state where the slip of chain 13 is not being suppressed is denoted by sign X. Sign Δ denotes an intermediate state between the state denoted by sign ◯ and the state denoted by sign X.

As shown in FIG. 7, (A)-condition is defined by (C-T contact) X, (C: riding-T: sinking) X, (C-T engagement) X and (C: slip suppression) X. (B)-condition is defined by (C-T contact) ◯, (C: riding-T: sinking) ◯, (C-T engagement) X and (C: slip suppression) X. (C)-condition is defined by (C-T contact) ◯, (C: riding-T: sinking) ◯, (C-T engagement) X and (C: slip suppression) Δ. Moreover, (D)-condition is defined by (C-T contact) ◯, (C: riding-T: sinking) Δ, (C-T engagement) ◯ and (C: slip suppression) ◯.

Figure 8:
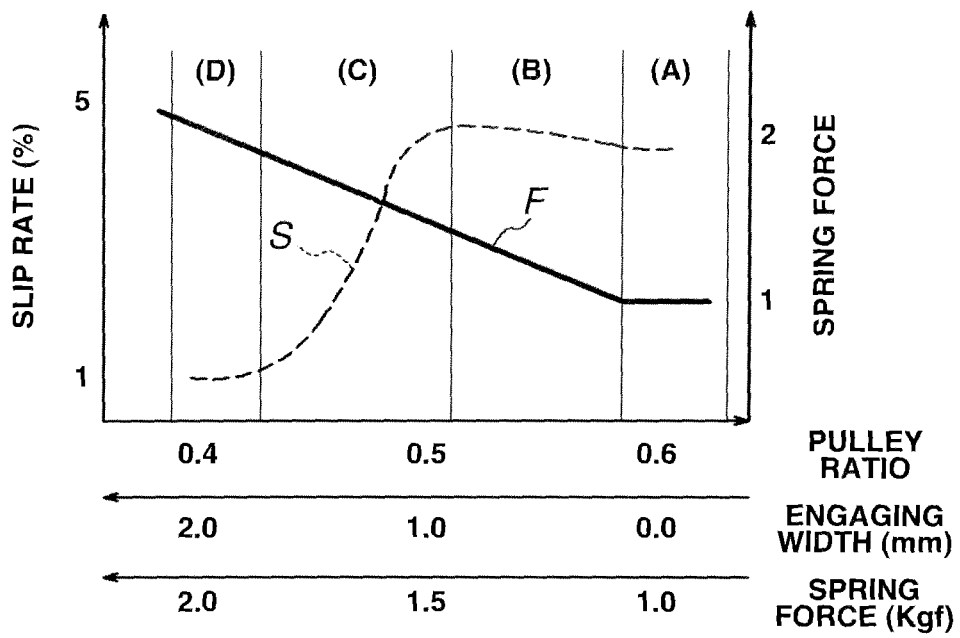
FIG. 8 An explanatory graph showing the relations of a slip rate of pulley shaft and a spring force of movable tooth, with respect to a pulley ratio.

FIG. 8 is an explanatory graph showing the relations of a slip rate of pulley shaft and a spring force of movable tooth, with respect to a pulley ratio. As shown in FIG. 8, the slip rate S of shaft 14 of driven pulley 12 (slip rate of SEC shaft) is approximately equal to 1% when the pulley ratio of driven pulley 12 is equal to 0.4. This slip rate S is approximately equal to 4.5% when the pulley ratio of driven pulley 12 is equal to 0.5, and is approximately equal to 4% when the pulley ratio is equal to 0.6. The spring force (teeth spring force of SEC shaft) F of movable tooth 16 is approximately equal to 2 when the pulley ratio of driven pulley 12 is equal to 0.4. This spring force F is approximately equal to 1.5 when the pulley ratio is equal to 0.5, and is approximately equal to 1 when the pulley ratio is equal to 0.6.

When the pulley ratio is equal to 0.4, an engaging width (overlapping depth) between the chain 13 and the movable tooth 16 is equal to 2.0 mm, and the spring force is equal to 2.0 Kgf. When the pulley ratio is equal to 0.5, the engaging width is equal to 1.0 mm and the spring force is equal to 1.5 Kgf. Moreover, when the pulley ratio is equal to 0.6, the engaging width is equal to 0.0 mm and the spring force is equal to 1.0 Kgf. The above-mentioned (A)-condition is satisfied when the pulley ratio is near 0.6. The (B)-condition is satisfied when the pulley ratio falls within a range approximately from 0.5 to 0.6. The (C)-condition is satisfied when the pulley ratio falls within a range approximately from 0.4 to 0.5. The (D)-condition is satisfied when the pulley ratio is near 0.4.

At first, when the transmission ratio (pulley ratio) is larger than a value of the setting for highest speed (see (A) of FIGS. 7 and 8) as the operating state of CVT 10, a sheave surface of driven pulley 12 is in contact with end surfaces of pins 18 of chain 13 to transmit a power with a slip therebetween. At this time, the concave portion 17a of chain link 17 is not in contact with the movable tooth 16 of shaft 14 (see FIG. 2).

Next, when the concave portion 17a becomes in contact with the movable tooth 16 (see (B) of FIGS. 7 and 8) because of a gradual approach of transmission ratio to the setting for highest speed, a friction force which is generated by the contact between the concave portion 17a and the movable tooth 16 is too weak to suppress the slip of chain.

When the concave portion 17a becomes more strongly in contact with the movable tooth 16 (see (C) of FIGS. 7 and 8) because of a further approach of transmission ratio to the setting for highest speed, the contact between concave portion 17a and movable tooth 16 becomes stronger while causing the slip of chain 13. At this time, if the concave portions 17a are in phase with the movable teeth 16, the protruding amount of movable tooth 16 becomes large. On the other hand, if the concave portions 17a are not in phase with the movable teeth 16 (if a phase of the concave portions 17a is shifted from a phase of the movable teeth 16), the movable teeth 16 become in the retracted state where the movable tooth 16 is sinking into the shaft 14.

Figure 9:
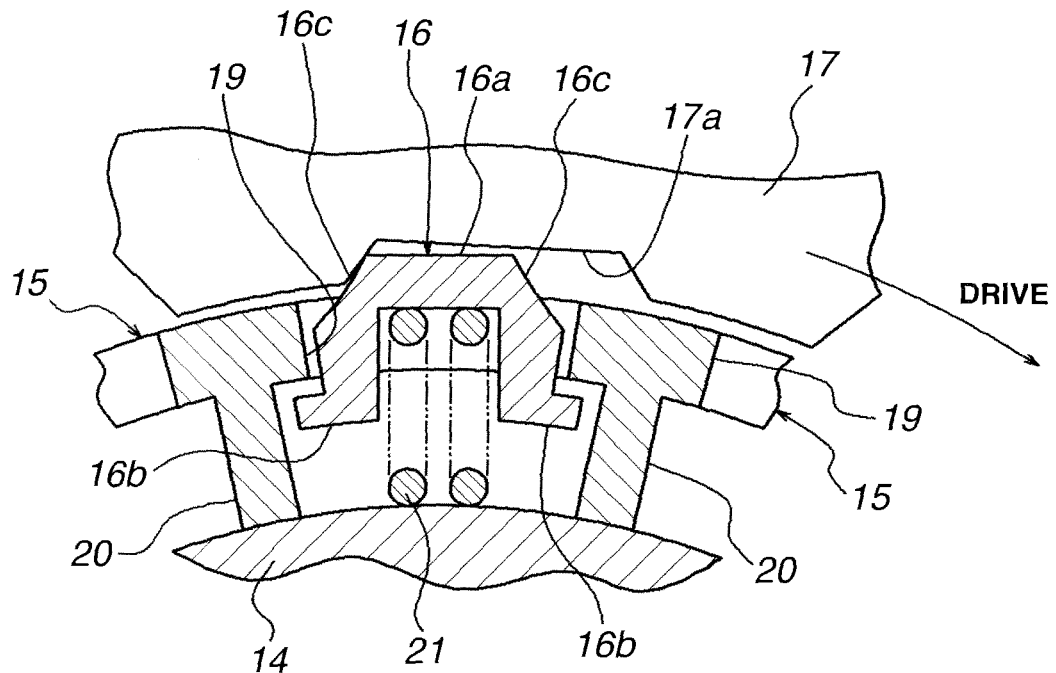
FIG. 9 An explanatory cross-sectional view showing a state where the movable tooth is protruding from a movable-teeth installation hole relative to the chain which is being driven.
Figure 10:
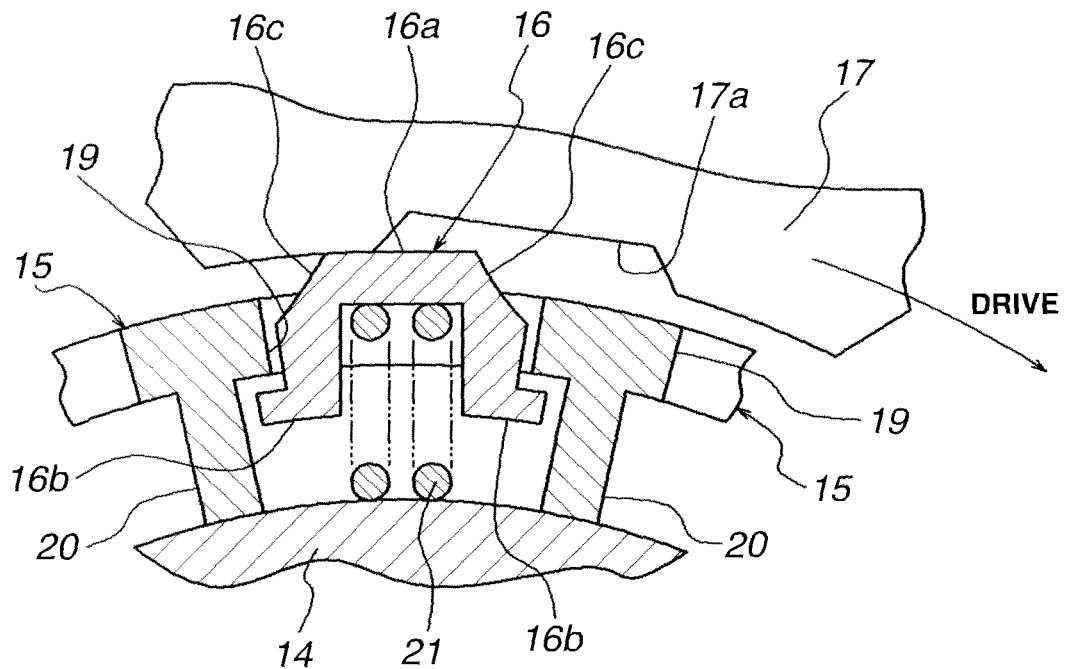
FIG. 10 An explanatory cross-sectional view showing a state where the movable tooth is sinking into the movable-teeth installation hole relative to the chain which is being driven.
Figure 11:
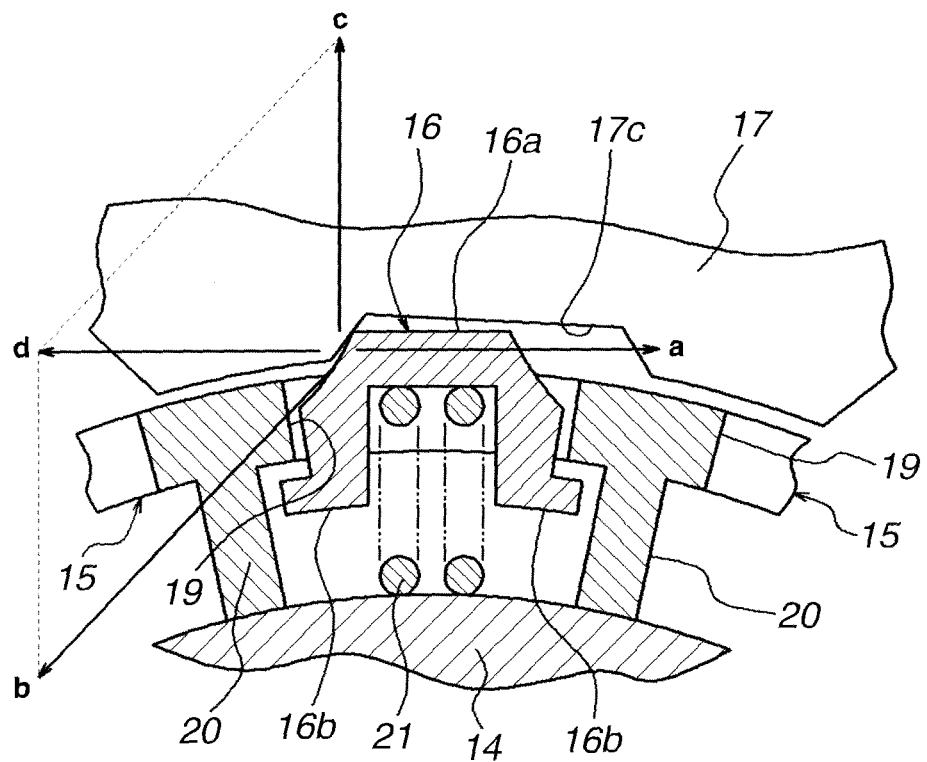
FIG. 11 An explanatory cross-sectional view showing a relation of forces under a state where the chain is in contact with a protruding step portion of movable tooth.

FIG. 9 is an explanatory cross-sectional view showing a state where the movable tooth is protruding from the movable-teeth installation hole relative to the chain which is being driven. FIG. 10 is an explanatory cross-sectional view showing a state where the movable tooth is sinking into the movable-teeth installation hole relative to the chain which is being driven. FIG. 11 is an explanatory cross-sectional view showing a relation of forces under a state where the chain is in contact with the protruding step portion of movable tooth.

As shown in FIGS. 9 and 10, the movable tooth 16 becomes in the state where the movable tooth 16 is protruding from the movable-teeth installation hole 19 (see FIG. 9) relative to the chain 13 which is being driven (a drive direction of chain 13 is indicated by an arrow in FIG. 9), or becomes in the state where the movable tooth 16 is sinking into the movable-teeth installation hole 19 (see FIG. 10). Between these two states, particularly when the concave portion 17a of chain link 17 is in contact with the inclined surface 16c of protruding step portion 16a as shown in FIG. 11, the movable tooth 16 receives three forces of a force for slipping on the chain 13 (=slipping force a), a slope friction force b, and a spring force c.

It is determined whether the slip of chain 13 is present or absent, from a magnitude relation between the total sum of "slipping forces a" and the total sum of "slip reaction forces d" over a winding region of chain 13, as shown in following formulas (1) and (2). This slip reaction force d is a resultant force of the slope friction force b and the spring force c.

$$\Sigma \text{ slip reaction force d} < \Sigma \text{ slipping force a} \rightarrow \text{The slip of chain 13 is generated.} \quad (1)$$

$$\Sigma \text{ slip reaction force d} > \Sigma \text{ slipping force a} \rightarrow \text{The slip of chain 13 is small or not generated.} \quad (2)$$

When the transmission ratio of CVT 10 has finally reached the setting for highest speed (see FIG. 3), the pitch (interval) between adjacent two movable teeth 16 is equal to the pitch (interval) between adjacent two concave portions 17a of chain links 17. Hence, all the movable teeth 16 existing in the winding region of chain 13 are meshed with the chain 13. As a result, the total sum of slip reaction forces d becomes greatest (see (D) of FIGS. 7 and 8). Accordingly, the state where the chain slip is small or not generated can be attained as shown in formula (2). Therefore, a fuel economy can be improved when the transmission ratio is in the setting for highest speed.

Thus, when the CVT 10 is in the setting for highest speed, the chain 13 located at the bottom of V-groove of driven pulley 12 becomes in contact with the shaft portion 14 of driven pulley 12 and also engages with the shaft portion 14 through the movable teeth 16 engaging with the chain links 17, while causing the end portions of pins 18 to abut on the driven pulley 12. That is, a mechanism for engaging with the chain 13 (movable teeth 16) is provided to the shaft portion 14 of the driven pulley 12 which forms a small winding radius of chain 13 at the time of setting for highest speed, so as to be movable in the radial direction of shaft portion 14.

In a case of conventional structure in which a gear for engaging with teeth of V-belt is provided at a bottom of V-groove of pulley, it is inevitable that the gear attacks the V-belt when the gear does not securely engage with the teeth of V-belt, because the gear is fastened. However, in the case of CVT 10 according to the present invention, the movable teeth 16 provided to the shaft 14 located at the bottom of pulley V-groove move in the radial direction of shaft 14 by virtue of its movable structure even if the movable teeth 16 do not securely engage with the chain 13. Therefore, the movable teeth 16 do not attack the chain 13 in the case of CVT 10 according to the present invention.

Moreover, it can be suppressed that the chain 13 slips on the driven pulley 12 when the chain 13 is driving the driven pulley 12, since the mechanism for engaging with the chain 13 is provided to the shaft portion 14 of driven pulley 12. Accordingly, the CVT 10 can achieve the improvement of fuel-consumption performance which is produced in the case of stepless shift, and also achieve a high efficiency which is produced normally in the case of step shift. In other words, in a case that a belt/chain is used as the driving-force transmitting means of CVT, in general, a power is transmitted while causing a slip rate falling within a range from 3% to 5% in one pulley forming a smaller winding radius. Hence, in this case, the fuel economy is worsened when the pulley ratio is in the setting for highest speed and in the setting for lowest speed. In particular, the fuel economy at the time of setting for highest speed is worsened. However, in the case of CVT 10 according to the present invention, such a worsening can be effectively solved.

Moreover, when the pulley ratio is larger than a value of the setting for highest speed (see (C) of FIG. 8), the slip rate between the driven pulley 12 and the chain 13 can be reduced. When the pulley ratio is in the setting for highest speed (see (D) of FIG. 8), the driven pulley 12 and the chain 13 do not slip on each other or almost do not slip on each other.

Figure 12:
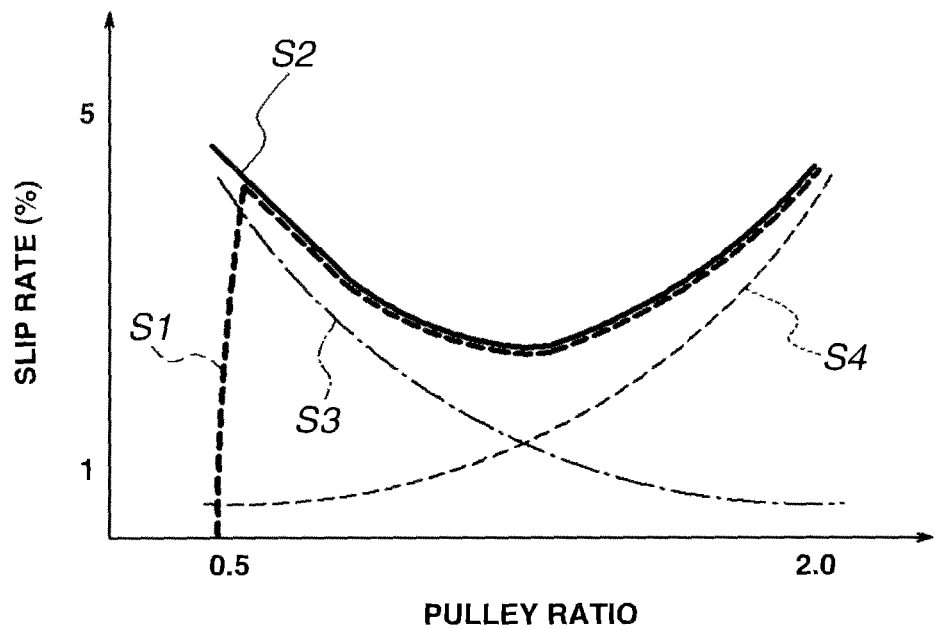
FIG. 12 An explanatory view showing a slip-less state according to the present invention and a slip state of conventional technology, by using a relation between the pulley ratio and the slip rate.

FIG. 12 is an explanatory view showing a slip-less state according to the present invention and a slip state of conventional technology, by using a relation between the pulley ratio and the slip rate. FIG. 12 respectively shows a slip-less state S1 at the setting for highest speed in the CVT 10 according to the present invention, a slip state S2 in the conventional technology, a slip state S3 of shaft of driven pulley (slip of SEC shaft) in the conventional technology, and a slip state S4 of shaft of drive pulley (slip of PRI shaft) in the conventional technology.

As shown in FIG. 12, when the pulley ratio is larger than the setting value for highest speed (see (C) of FIG. 8), the movable teeth 16 provided to the shaft 14 of driven pulley 12 move in the radial direction of shaft portion 14 so that the slope friction force b is generated between the movable teeth 16 and the chain 13. Thereby, the slip rate between the driven pulley 12 and the chain 13 is reduced. On the other hand, when the pulley ratio is in the setting for highest speed (see (D) of FIG. 8), the movable teeth 16 sufficiently engage with the chain 13. Thereby, the driven pulley 12 and the chain 13 become in the state where there is no slip between the driven pulley 12 and the chain 13 or the state where there is almost no slip between the driven pulley 12 and the chain 13.

As a result, it can be suppressed that the chain 13 slips on the driven pulley 12 when the pulley ratio is in the setting for highest speed (see (D) of FIG. 8) and when the pulley ratio is larger than the setting for highest speed. Accordingly, both of the improvement in fuel-economy performance of stepless shift and the high efficiency of step shift can be attained.

Moreover, the inclined surface 16c of protruding step portion 16a of movable tooth 16 which is a portion protruding from the movable-teeth installation hole 19 is designed to have a maximum effective contact range under the state where the concave portion 17a of chain link 17 is engaging with the movable tooth 16.

Figure 13:
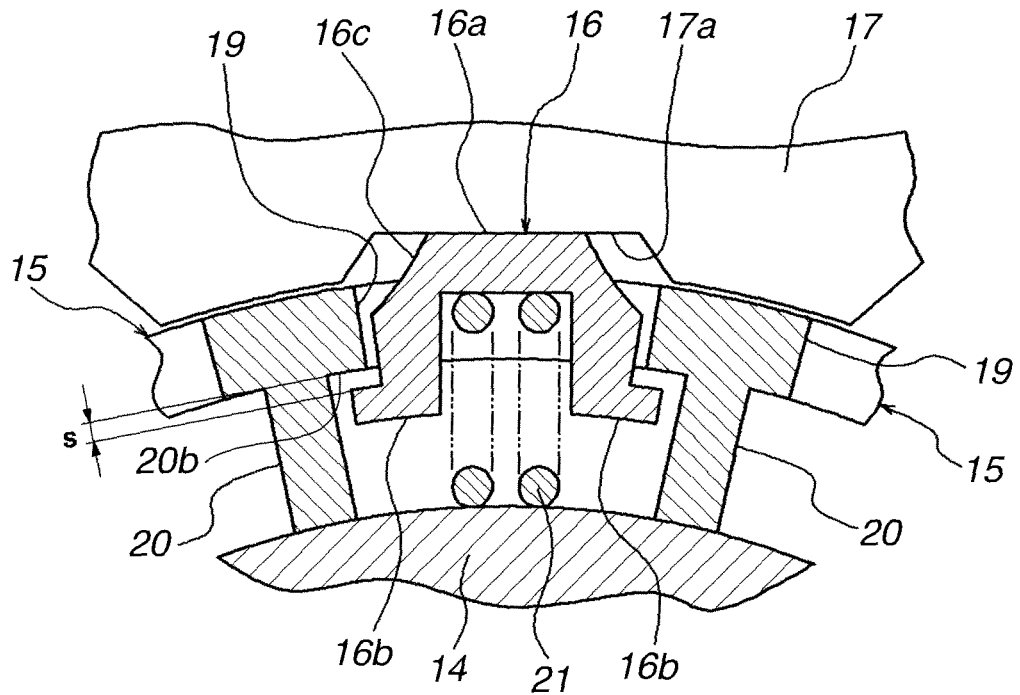
FIG. 13 An explanatory cross-sectional view showing the movable tool inside the movable-teeth fixing component, under the state where a concave portion of chain link is engaging with the movable tooth.

FIG. 13 is an explanatory cross-sectional view showing the movable tool inside the movable-teeth fixing component, under the state where the concave portion of chain link is engaging with the movable tooth. As shown in FIG. 13, a space (gap) S is given between the stopping portion 16b of movable tooth 16 and the stepped surface 20b of movable-teeth fixing component 15, under the state where the concave portion 17a of chain link 17 has engaged with the movable tooth 16. That is, the stopping portion 16b of movable tooth 16 and the stepped surface 20b of movable-teeth fixing component 15 are designed so as not to allow the stopping portion 16b and the stepped surface 20b to become in contact with each other under the state where the concave portion 17a of chain link 17 is engaging with the movable tooth 16. The stepped surface 20b functions as the protrusion restricting portion for restricting the protrusion of movable tooth 16.

Thereby, the effective contact range between the inclined surface 16c of movable tooth 16 and a boundary inclined-surface of concave portion 17a is maximized to enlarge the friction force therebetween. This boundary inclined-surface of concave portion 17a means a boundary portion between the concave portion 17a and components other than the concave portion 17a. As a result, it can be more effectively suppressed that the chain 13 slips on the movable teeth 16 installed to the shaft 14 located at the bottom of V-groove of driven pulley 12. In the above example of this embodiment, the movable tooth 16 is movable in the radial direction of shaft portion 14 to protrude from the movable-teeth installation hole 19 by the biasing member 21. However, according to this embodiment, a function similar as the biasing member 21 may be obtained without using the biasing member 21 provided as a separated member.

Figure 14:
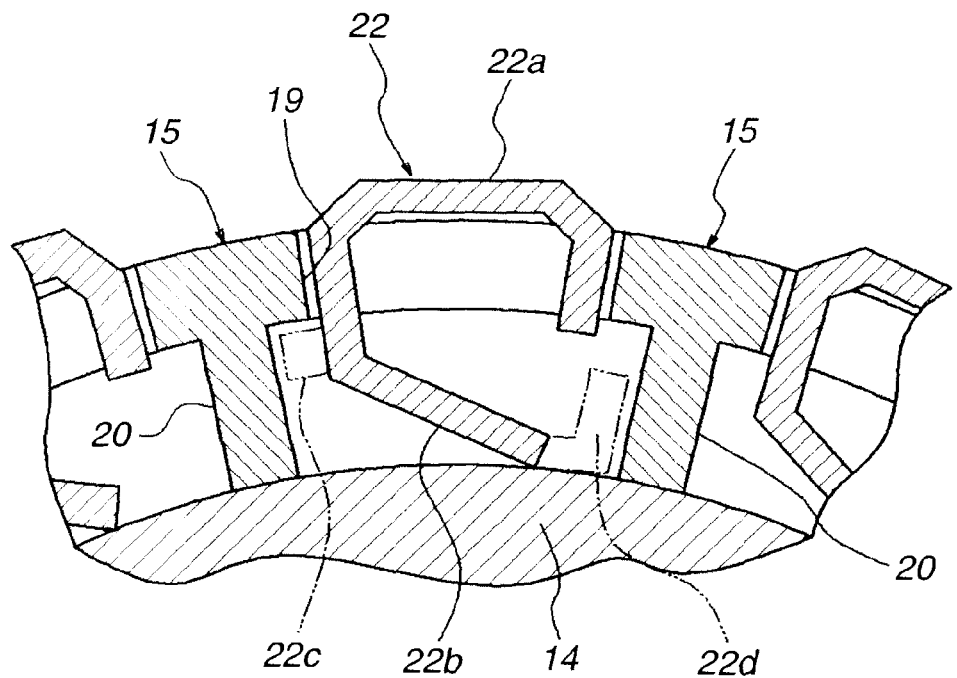
FIG. 14 An explanatory cross-sectional view showing another example of movable tooth.

FIG. 14 is an explanatory cross-sectional view showing another example of movable tooth. As shown in FIG. 14, a movable tooth 22 may be formed to include a protruding step portion 22a and a leg portion 22b. The protruding step portion 22a protrudes from the movable-teeth installation hole 19 when being installed to the movable-teeth fixing component 15, and extends in the axial direction of the movable-teeth fixing component 15. The leg portion 22b is located on a lower portion of the protruding step portion 22a, and has a compression biasing force. That is, for example, the protruding step portion 22a and the leg portion 22b may be integrally formed by a biasing member (material), to define the movable tooth 22 having a function similar as that of movable tooth 16.

Moreover, in order to stably support the movable tooth 22 and in order to cause the movable tooth 22 to function in the same manner as the movable tooth 16, stopping portions 22c and 22d which function in the same manner as the stopping portions 16b may be provided to the movable tooth 22.

Second Embodiment

Figure 15:
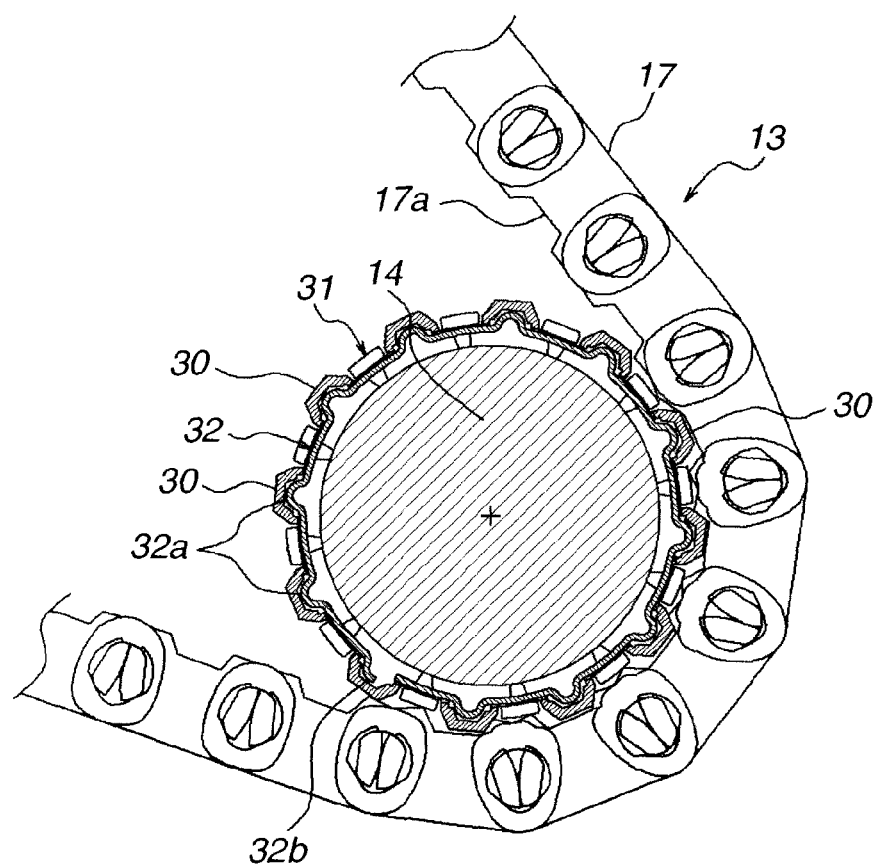
FIG. 15 An explanatory view showing a state where the chain has been wound around the shaft portion of pulley, in a movable teeth structure according to a second embodiment of the present invention.

FIG. 15 is an explanatory view showing a state where the chain has been wound around the shaft portion of pulley, in a movable teeth structure according to a second embodiment of the present invention. As shown in FIG. 15, the plurality of movable teeth 30 (for example, twelve movable teeth are shown in FIG. 15) are installed in the outer surface of shaft portion 14 of pulley through a movable-teeth guide 31 formed in a shape of cylindrical tube. That is, the movable-teeth guide 31 functions as a movable-teeth fixing component for mounting the movable teeth 30. Each movable tooth 30 is installed to the movable-teeth guide 31 under a state where the movable tooth 30 is biased by the biasing force of a spring 32 formed in an annular shape (ring shape). An upper-end side of movable tooth 30 protrudes from an (radially-) outer surface of movable-teeth guide 31 by the biasing force.

The protruding upper-end side of movable tooth 30 is stopped or caught by the concave portions 17a formed in the chain links 17 of chain (lockup chain) 13 functioning as the driving-force transmitting means, and thereby, the movable teeth 30 engage with the chain 13.

That is, in the second embodiment, the biasing member 21 such as coil spring (see FIG. 5) in the movable teeth structure according to the first embodiment is replaced with the ring-shaped spring 32. The movable teeth 30 are biased to protrude in the radially outer direction of shaft portion 14 of pulley, by these ring-shaped springs 32. Structures and operations of the second embodiment which are other than the structure for obtaining the biasing force by the ring-shaped spring 32 and its related structures are similar as those of the movable teeth structure according to the first embodiment.

Figure 16:
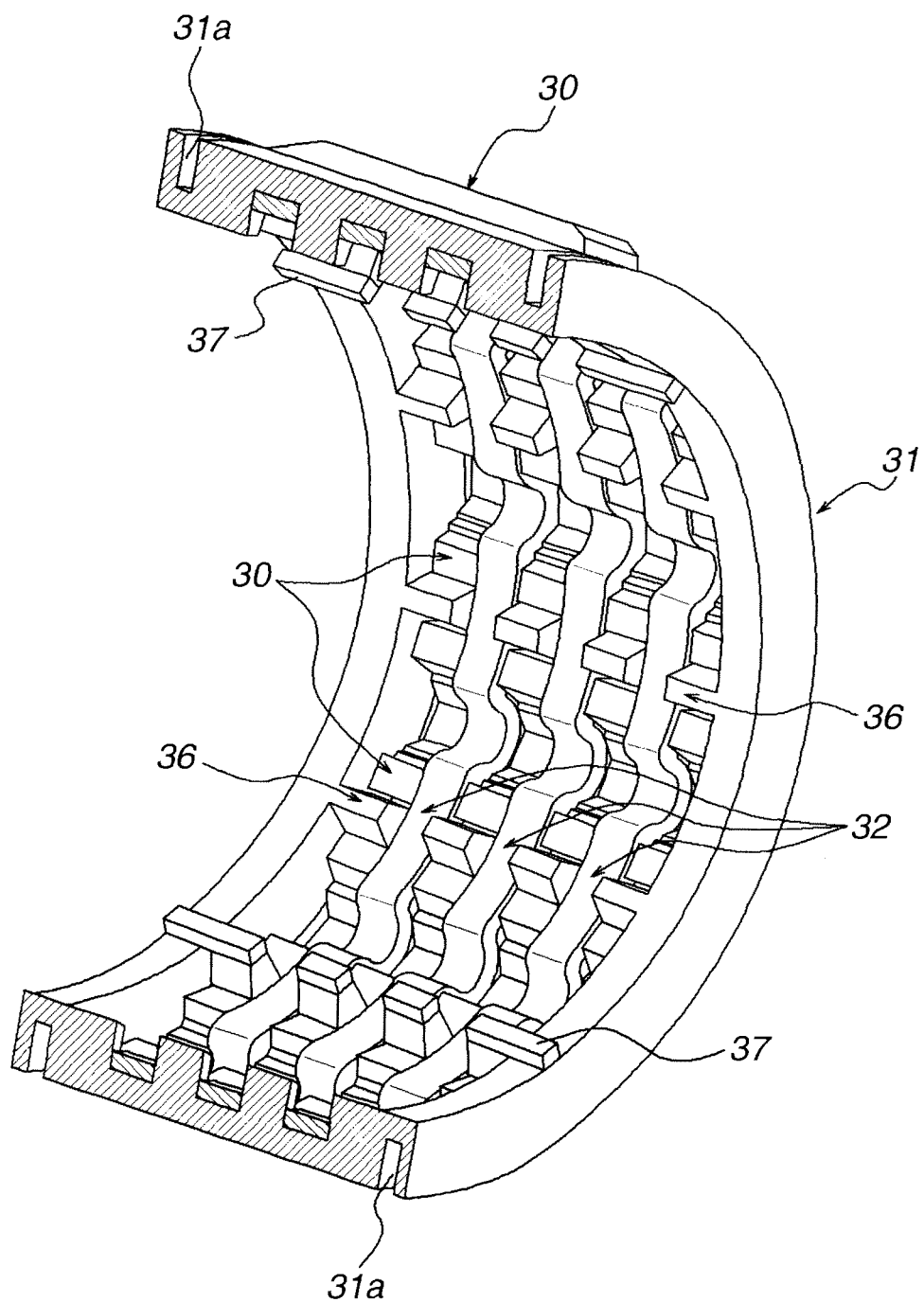
FIG. 16 An explanatory view showing a part of movable-teeth guide into which the movable teeth of FIG. 15 have been installed, by an isometric projection view from the reverse side of movable-teeth guide.

FIG. 16 is an explanatory view showing a part of the movable-teeth guide into which the movable teeth of FIG. 15 have been installed, by an isometric projection view from the reverse side of movable-teeth guide. As shown in FIG. 16, the respective movable teeth 30 are spaced at approximately equal intervals in a circumferential direction of movable-teeth guide 31, so as to be buried in the movable-teeth guide 31. The springs 32 are attached to an inner-surface (reverse-surface) side of the movable-teeth guide 31. The plurality of springs 32 (for example, three springs are shown) are disposed substantially parallel to an axial direction of the movable-teeth guide 31. The plurality of springs 32 hold and bias the movable teeth 30 to the movable-teeth guide 31.

Figure 17:
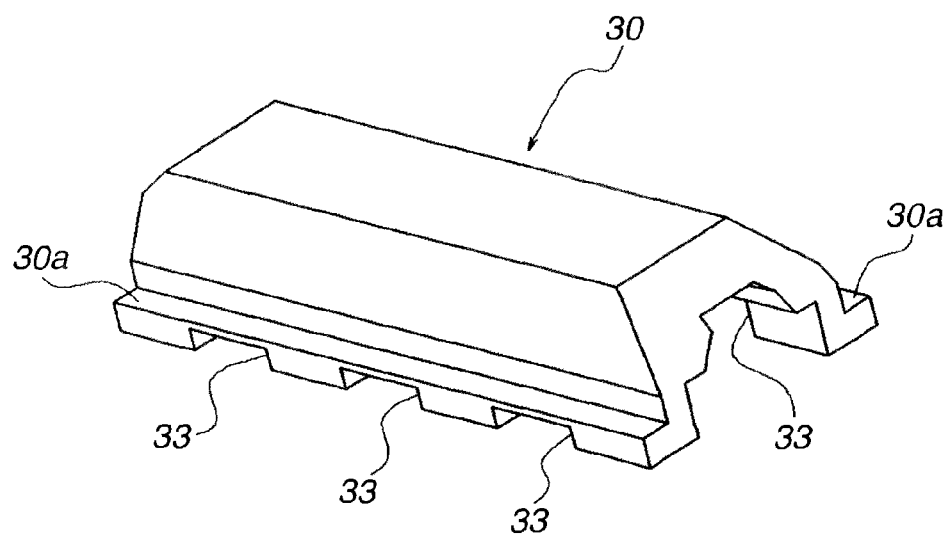
FIG. 17 An explanatory view showing the movable tooth by an isometric projection.

FIG. 17 is an explanatory view showing the movable tooth by an isometric projection. As shown in FIG. 17, the movable tooth 30 opens at its lower-end-surface side and both lateral-end-surface sides. That is, the movable tooth 30 is formed substantially in a rectangular box shape having an Ω-shaped vertical cross-section. Both lower sides of long-side portions of movable tooth 30 protrude outwardly in a flange shape so as to define stopping surfaces 30a. The movable tooth 30 includes a plurality of movable-teeth spring mounting grooves 33 for mounting the springs 32, in a reverse-surface side of the stopping surfaces 30a. Each movable-teeth spring mounting groove 33 has a shape enabling the spring 32 to be installed in the movable-teeth spring mounting groove 33 in a buried state. The plurality of rows (for example, three rows are shown) of movable-teeth spring mounting grooves 33 are spaced at approximately equal intervals in an extending direction of long side (longitudinal direction) of movable teeth 30.

Figure 18:
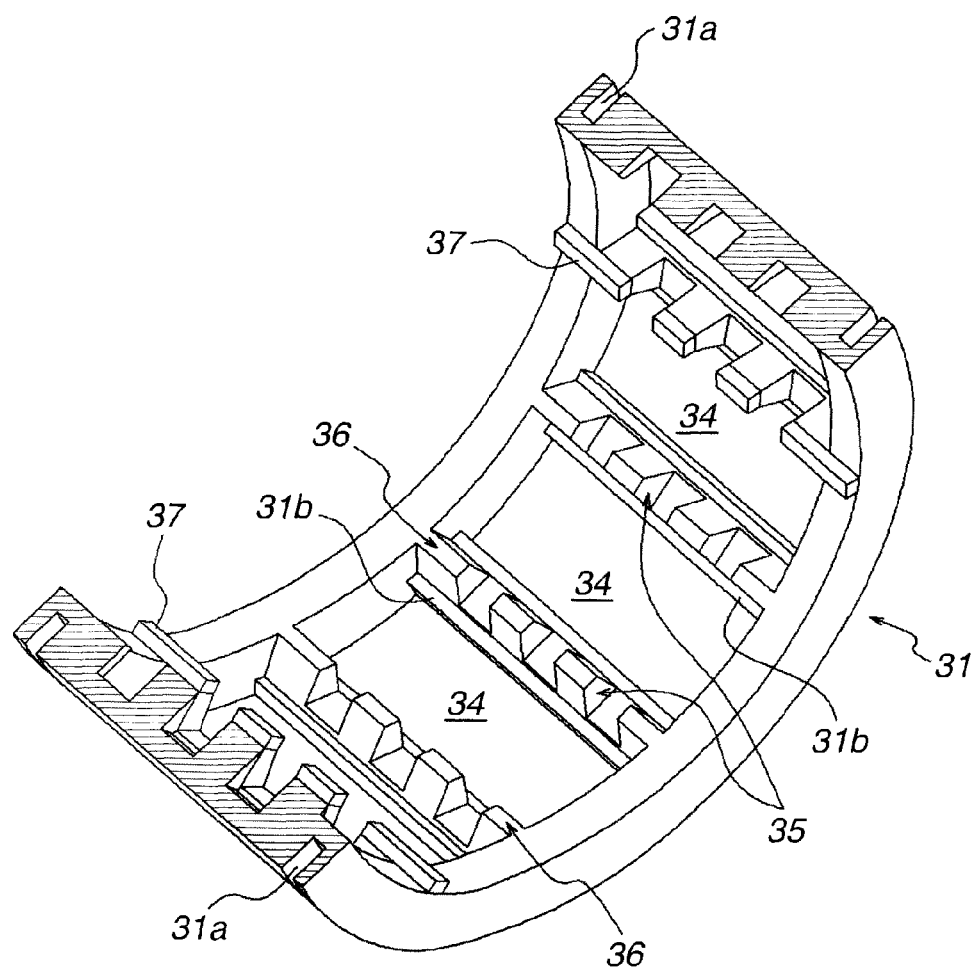
FIG. 18 An explanatory view showing a part of the reverse side of movable-teeth guide by an isometric projection.

FIG. 18 is an explanatory view showing a part of the reverse side of movable-teeth guide, by an isometric projection. As shown in FIG. 18, the movable-teeth guide 31 is formed in a shape of cylindrical tube (see FIG. 15). As shown in FIG. 18, a plurality of movable-teeth installation holes (through-holes) 34 for installing the movable teeth 30 therein are formed through a circumferential surface of movable-teeth guide 31, at approximately equal intervals. The movable-teeth guide 31 includes guide-spring mounting grooves 35 for mounting the springs 32 therein, in an inner circumferential surface of movable-teeth guide 31.

This movable-teeth guide 31 can be divided into two pieces by division lines extending in an axial direction of its cylindrical tube shape. The divided two pieces of movable-teeth guide 31 are installed in the outer surface of shaft portion 14 of pulley (for example, driven pulley 12) so as to be integrated with the shaft portion 14. Then, snap rings (not shown) for fastening the movable-teeth guide 31 are attached in grooves 31a which are formed in both end portions of the circumferential surface of movable-teeth guide 31, and thereby, the movable-teeth guide 31 is fastened in an integrally installed state.

Each movable-teeth installation hole 34 passes through inner and outer surfaces of circumferential wall of movable-teeth guide 31, and is formed in an elongated-hole shape having its long side extending in the axial direction of movable-teeth guide 31 (i.e., in a shape elongated in the axial direction). The respective movable-teeth installation holes 34 are placed at approximately equal intervals in a circumferential direction of movable-teeth guide 31. The movable-teeth guide 31 includes partition-wall portions 36 projecting toward a central axis (toward an inner side) of movable-teeth guide 31. Each partition-wall portion 36 is formed at a boundary portion between adjacent movable-teeth installation holes 34, and at the inner surface of circumferential wall of movable-teeth guide 31. A circumferential width of each partition-wall portion 36 is narrower than a circumferential width of a portion of circumferential wall from which the partition-wall portion 36 protrudes, relative to the circumferential direction of cylindrical shape of movable-teeth guide 31. Thereby, stepped surfaces (protrusion restricting portions) 31b are formed on both sides of each partition-wall portion 36 in the circumferential direction of cylindrical shape of movable-teeth guide 31. The stepped surfaces 31b are located on both sides of the movable-teeth installation hole 34.

Each guide-spring mounting groove 35 is formed by cutting the partition-wall portion 36 from an axis side of cylindrical shape of the movable-teeth guide 31, and has a shape enabling the spring 32 to be installed in the guide-spring mounting groove 35 in a buried state. The guide-spring mounting grooves 35 are linked to one another through all the partition-wall portions 36, linearly along the circumferential direction of cylindrical shape of movable-teeth guide 31. The plurality of rows (for example, three rows are shown in the drawing, also see FIG. 17) of guide-spring mounting grooves 35 are spaced at approximately equal intervals in the axial direction of cylindrical shape of movable-teeth guide 31. Under the state where the movable teeth 30 have been installed in the movable-teeth installation holes 34, the guide-spring mounting grooves 35 are linearly connected with the movable-teeth spring mounting grooves 33, and thereby are integrated with the movable-teeth spring mounting grooves 33.

Moreover, a stopping protrusion 37 is formed on at least one (for example, two are shown in FIG. 18) of partition-wall portions 36, over an entire region of partition-wall portion 36 in the axial direction of cylindrical shape of movable-teeth guide 31. The stopping protrusion 37 protrudes toward the center side of cylindrical shape of movable-teeth guide 31. When the movable-teeth guide 31 is installed to the shaft portion 14, the stopping protrusion 37 is caught and locked by a receiving portion (not shown) formed in the shaft portion 14, and thereby, the movable-teeth guide 31 can be integrated with the shaft portion 14.

Figure 19:
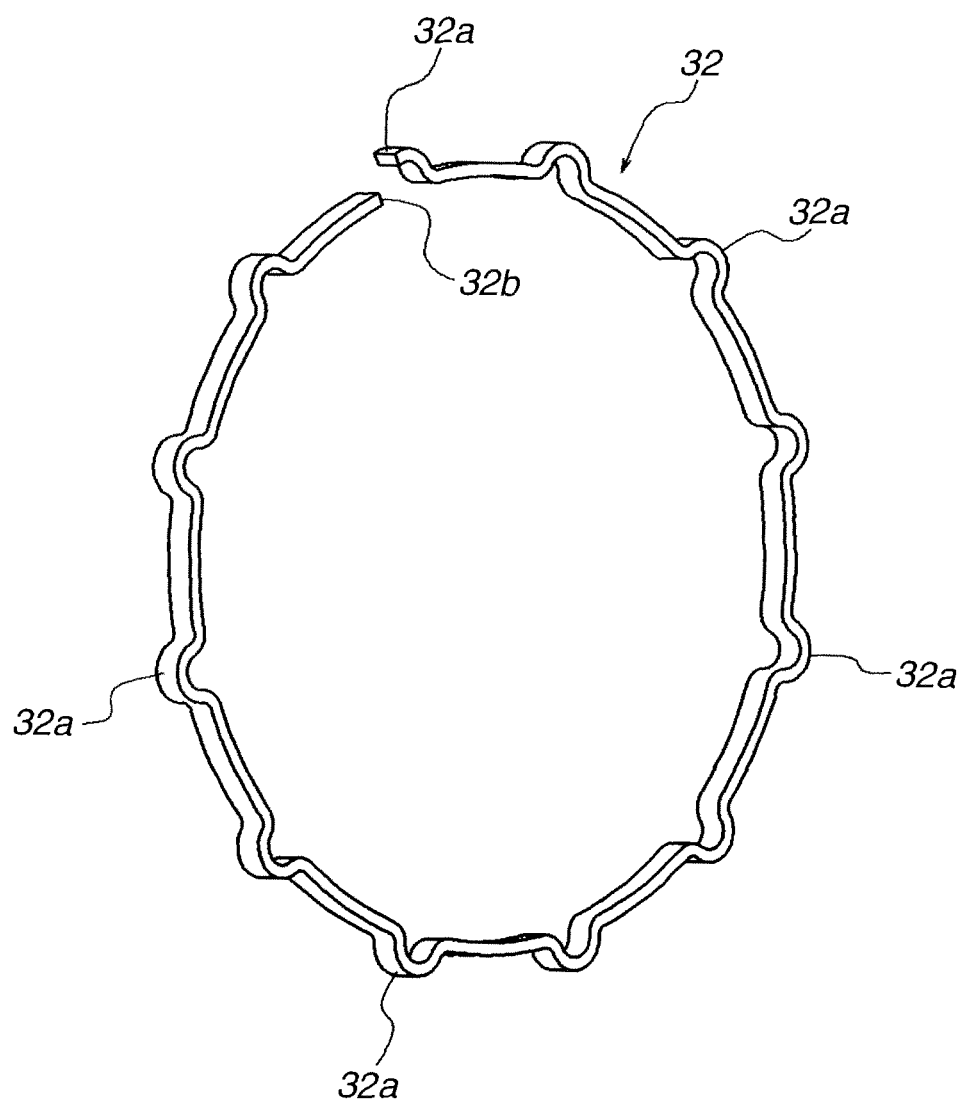
FIG. 19 An explanatory view showing a spring of FIG. 15 by an isometric projection.

FIG. 19 is an explanatory view showing the spring of FIG. 15 by an isometric projection. As shown in FIG. 19, the spring 32 is formed in an annular (ring) shape which has been cut off at one part of the annular shape. The spring 32 includes a lateral width which enables the spring 32 to be received in the movable-teeth spring mounting groove 33 and the guide-spring mounting groove 35. The spring 32 includes a plurality of protrusions 32a (for example, twelve protrusions are shown). The number of protrusions 32a corresponds to the number of movable teeth 30 installed in the movable-teeth guide 31.

Each protrusion 32a is formed to outwardly protrude in an inverted U-shape, so as to allow the protrusion 32a to enter to an upper-end side of internal space of movable tooth 30 from the inner side of movable-teeth guide 31, and to remain located in the upper-end side of internal space. The protrusions 32a are spaced at approximately equal intervals, over an entire circumference of the spring 32. A non-connected portion 32b is defined by cutting and removing the one part of the protrusion 32a in the circumferential direction of ring (annular shape). When a diameter of this spring 32 is reduced, the spring 32 applies a biasing force in a direction that enlarges the diameter of spring 32 by means of (original-state-) restoring force.

By having the above-mentioned structures, the movable teeth 30 are inserted into the movable-teeth installation holes 34 from the inner side of (divided one piece of) movable-teeth guide 31. Then, the movable teeth 30 are mounted in the movable-teeth installation holes 34 under the state where the upper-end side of each movable tooth 30 has protruded from the movable-teeth installation hole 34. Then, the two pieces of movable-teeth guide 31 into which the movable teeth 30 have been installed are combined with each other to form the cylindrical shape. Thereby, the movable-teeth spring mounting grooves 33 are connected with the guide-spring mounting grooves 35 so as to form a plurality of rows (for example, three rows) of annular grooves in which the springs 32 are installed, in the inner-surface side of movable-teeth guide 31 (see FIG. 16).

The movable-teeth guide 31 into which the movable teeth 30 and the springs 32 have been installed is attached in the outer surface of shaft portion 14 of pulley (for example, driven pulley 12), and thereby mounted integrally to the shaft portion 14. Then, by attaching the snap rings (not shown) for fastening the movable-teeth guide 31 into the grooves 31a provided near the both end portions of circumferential surface of movable-teeth guide 31, the movable-teeth guide 31 is fastened in the mounted state.

When the spring 32 is installed to the movable-teeth spring mounting grooves 33 and the guide-spring mounting grooves 35 of the movable-teeth guide 31 in which the movable teeth 30 have been installed, the spring 32 places each protrusion 32a at an inner surface (reverse surface) of upper-end side of movable tooth 30 under the state where the diameter of spring 32 has been reduced. At this time, although the movable tooth 30 is pushed to the outside of movable-teeth guide 31 by a biasing force of spring 32, the stopping surfaces 30a of movable tooth 30 become in contact with the stepped surfaces 31b of movable-teeth guide 31 to restrict the movement of movable tooth 30. Thereby, each movable tooth 30 set in the movable-teeth installation hole 34 is maintained under the state where the upper end side of movable tooth 30 is protruding from the (radially-) outer surface of movable-teeth guide 31.

Under the state where the movable tooth 30 is protruding from the movable-teeth installation hole 34; the upper end side of movable tooth 30 has its protruding amount sufficient to engage with the concave portion 17a of chain 13 located at the bottom of V-groove of driven pulley 12, and also has its length in the axial direction of movable-teeth guide 31 which is sufficient to engage with the concave portion 17a.

Figure 20:
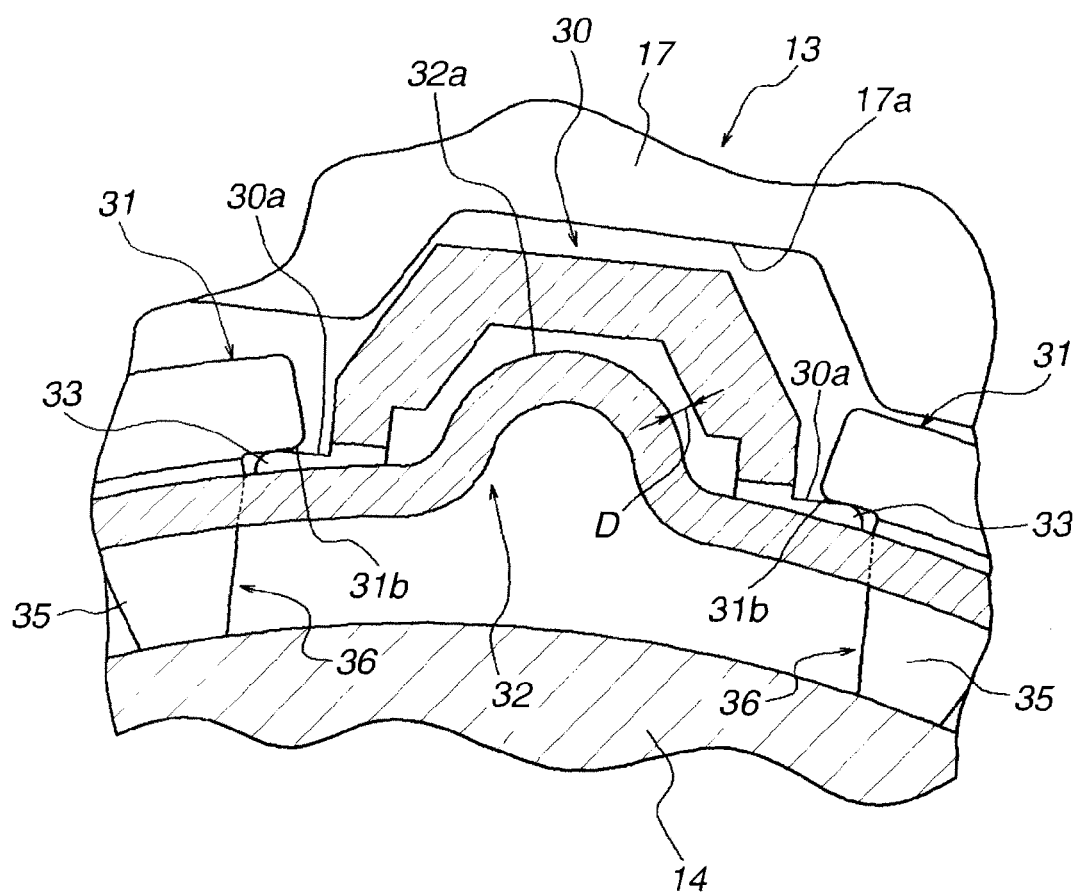
FIG. 20 An explanatory view partly showing a state where the movable tooth is supported in the movable-teeth guide.

FIG. 20 is an explanatory view partly showing a state where the movable tooth is supported in the movable-teeth guide. As shown in FIG. 20, the movable tooth 30 places the upper end side of movable tooth 30 in the concave portion 17a of chain 13 by the biasing force of springs 32, under the state where the movable tooth 30 is engaging with the chain 13. At this time, a clearance (gap) D is given between the protrusion 32a of spring 32 and the inner surface (reverse surface) of upper-end side of movable tooth 30, in a circumferential direction of spring 32. That is, each spring 32 has structures and functions such as its shape and biasing force, which can provide the clearance D between the protrusion 32a and the inner surface (reverse surface) of upper-end side of movable tooth 30.

When the spring 32 generates a necessary biasing force by reducing the diameter of spring 32, the protrusion 32a is permitted to be deformed by diameter-reducing force in the circumferential direction of spring 32, by virtue of the existence of clearances D. Thus, the diameter reduction of spring 32 can be conducted, so that the spring 32 can generate the necessary biasing force.

In the above-explained movable teeth structure according to the second embodiment, the movable teeth 30 are sinking under the movable pulley (slide pulley) 12b located close to the fixed pulley 12a (see FIG. 6B), except when the pulley ratio is in the setting for highest speed. At this time, each movable tooth 30 has a maximum amount of stroke (expansion-contraction action) in the radial direction of pulley (in the radial direction of shaft portion 14). Contrary to this, when the pulley ratio is in the setting for highest speed, the movable tooth 30 is protruding in the radial direction of pulley by the biasing force of spring 32 (see FIG. 6A) because the movable pulley 12b has moved in a direction away from the fixed pulley 12a.

After a shift operation for bringing the pulley ratio to the setting value for highest speed, the movable teeth 30 engage with the chain 13 so that a torque is applied to the movable teeth 30. Thereby, in proportion to this applied torque, the movable teeth 30 receive a force for pressing the movable teeth 30 in the (inwardly) radial direction of pulley. At this time, the spring 32 needs a level of biasing force that resists the force for pressing the movable teeth 30.

The ring-shaped spring 32 is installed on the outer circumference of shaft portion 14 of pulley, and functions to reduce or enlarge the diameter of ring-shaped spring 32 on the outer circumference of shaft portion 14. When the diameter of ring-shaped spring 32 is enlarged, the plurality of movable teeth 30 disposed on the outer circumference of shaft portion 14 are made to integrally protrude. That is, the spring 32 functions as a biasing member which is provided for each movable tooth 30 and which expands or contracts in the radial direction of shaft portion 14 of pulley so as to cause the movable teeth 30 to protrude.

Since the ring-shaped spring 32 is used as a means for applying biasing force to the movable teeth 30, the biasing force can be produced by reducing the diameter of spring 32. Hence, a stroke of the biasing member in the radial direction of pulley is not necessary in order to produce the biasing force. In a case that a disc spring is used as the means for applying biasing force to the movable teeth 30, a sufficient stroke amount cannot be obtained. Hence, in this case, multiple disc springs need to be used by stacking the multiple disc springs, and thereby, an assembling performance becomes worsened and/or the biasing force becomes unable to be stably applied.

Thus, by using the ring-shaped spring 32, the stroke in the radial direction of pulley becomes unnecessary in this embodiment. That is, the means for applying biasing force to the movable teeth 30 is provided without affecting the structure of shaft portion 14 of pulley. Accordingly, the strength of shaft portion 14 can be sufficiently ensured.

Moreover, since the spring 32 has an integral structure formed in the ring shape, it is easy to install the spring 32 into the moveable teeth 30 mounted in the moveable-teeth guide 31. Accordingly, the assembling performance in the moveable teeth structure according to this embodiment is improved.

Moreover, the spring 32 formed in a ring shape includes the protrusions 32a which are installed in the moveable teeth 30 in order to maintain a stability of application of biasing force. Thereby, the spring 32 does not move in its circumferential direction so that the non-connected portion 32b does not move. Accordingly, a location of spring 32 which is determined when the spring 32 is installed into the moveable-teeth guide 31 can be maintained.

Moreover, the spring 32 applies a biasing force to each of the plurality of movable teeth 30. The protrusions 32a for being caught by the respective movable teeth 30 and for applying biasing forces to the respective movable teeth 30 are formed integrally in the ring shape of spring 32. Accordingly, in this embodiment using the spring 32, it is not necessary to separately (individually) install a plurality of biasing members (means) corresponding to the respective movable teeth 30. Therefore, the assembling performance can be improved.

Furthermore, in a case that a great biasing force is required, this request can be satisfied by varying a plate thickness of the spring 32 and/or a diameter of ring shape of the spring 32.

Third Embodiment

Figure 21:
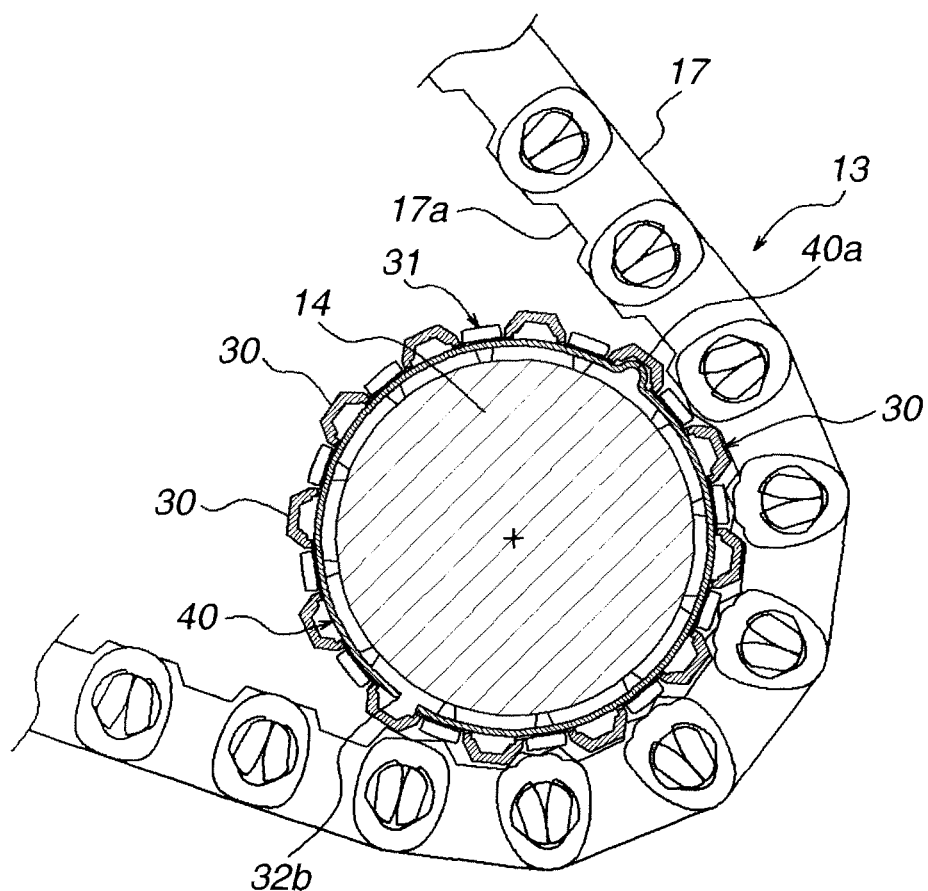
FIG. 21 An explanatory view showing a state where the chain has been wound around the shaft portion of pulley, in a movable teeth structure according to a third embodiment of the present invention.

FIG. 21 is an explanatory view showing a state where the chain has been wound around the shaft portion of pulley, in a movable teeth structure according to a third embodiment of the present invention. As shown in FIG. 21, in this movable teeth structure, a spring 40 including only is one protrusion is used as the means for applying biasing force to the movable teeth 30, instead of the spring 32 including the plurality of protrusions. The other structures and operations of the movable teeth structure according to the third embodiment are similar as those of the movable teeth structure according to the second embodiment.

Figure 22:
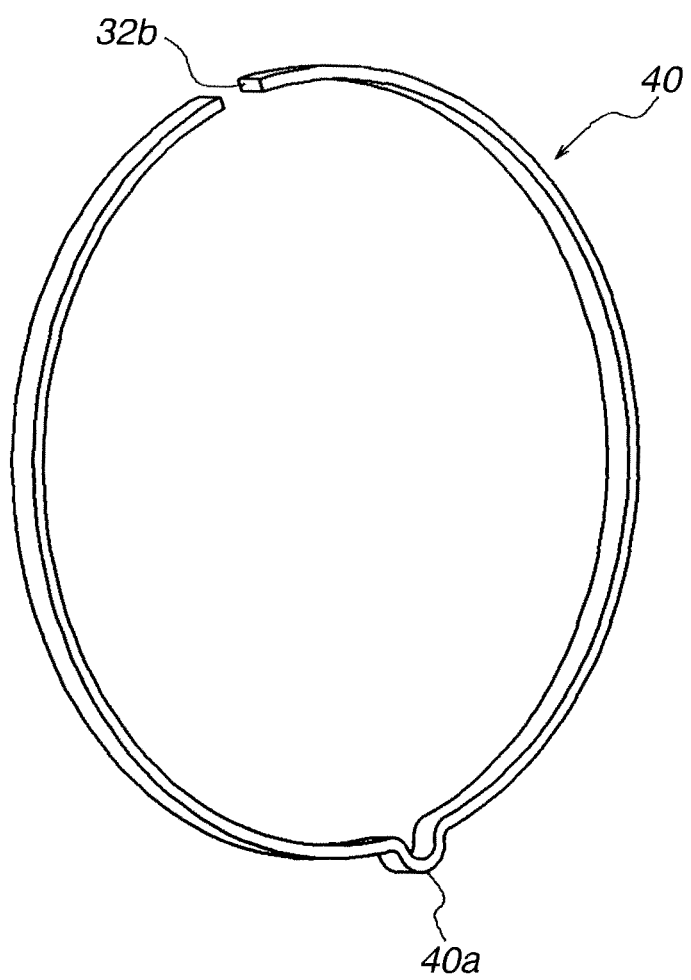
FIG. 22 An explanatory view showing the spring of FIG. 21 by an isometric projection.

FIG. 22 is an explanatory view showing the spring of FIG. 21, by an isometric projection. As shown in FIG. 22, the spring 40 is not formed with the protrusion 32a which is provided to the spring 32 and which is located in the movable tooth 30. Instead, the spring 40 includes one movement preventing portion 40a formed in a protruding manner, in order to prevent or stop a movement of spring 40 in a circumferential direction of spring 40. The other structures and operations of spring 40 are similar as those of the spring 32. This movement preventing portion 40a is located on an imaginary diameter line passing through the non-connected portion 32b on a plane of spring, i.e., the locations of movement preventing portion 40a and non-connected portion 32b correspond to both end portions of one diameter of spring 40.

When the springs 40 are attached to the movable teeth 30 installed in the movable-teeth guide 31, the non-connected portions 32b of the plurality of springs 40 (for example, three springs 40) are not arranged on a line extending in the axial direction of pulley, i.e., are arranged at locations displaced from one another in the circumferential direction of spring 40.

Thus, the spring 40 is formed with only one protrusion. Accordingly, a shape of spring does not become complicated. Therefore, a productivity of the spring can be enhanced.

Moreover, the movement preventing portion 40a can prevent the circumferential movement of spring 40. Hence, it can be prevented that the plurality of cutoff parts (non-connected portion 32b) of the springs 40 respectively provided in the axial direction of pulley are brought into one movable tooth 30 due to the movement of springs 40. Accordingly, more stable biasing force of springs can be applied.

Moreover, since the non-connected portions 32b are respectively shifted from one another in the circumferential direction of spring 40, the non-connected portions 32b at which the generation of biasing force is unstable are not concentrated on one movable tooth 30. Accordingly, the plurality of springs 40 can generate a more stable biasing force.

Fourth Embodiment

Figure 23:
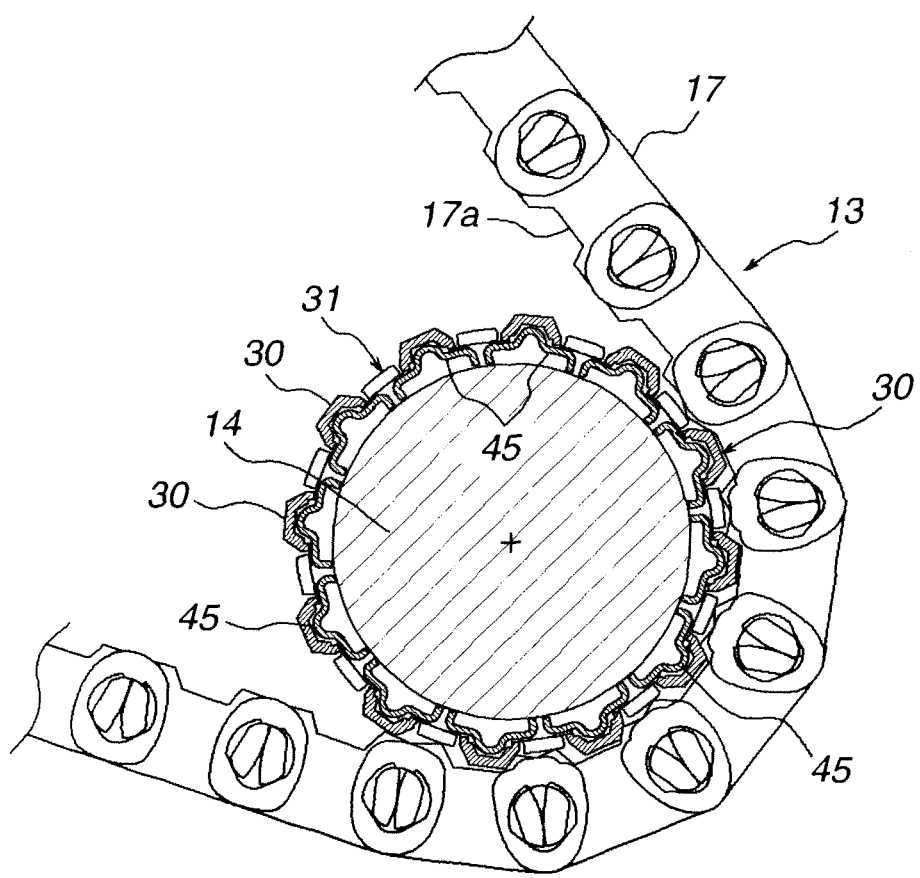
FIG. 23 An explanatory view showing a state where the chain has been wound around the shaft portion of pulley, in a movable teeth structure according to a fourth embodiment of the present invention.

FIG. 23 is an explanatory view showing a state where the chain has been wound around the shaft portion of pulley, in a movable teeth structure according to a fourth embodiment of the present invention. As shown in FIG. 23, in this movable teeth structure, a plurality of springs 45 are used as the means for applying biasing force to the movable teeth 30, instead of one spring 32. The other structures and operations of the movable teeth structure according to the fourth embodiment are similar as those of the movable teeth structure according to the second embodiment.

Figure 24:
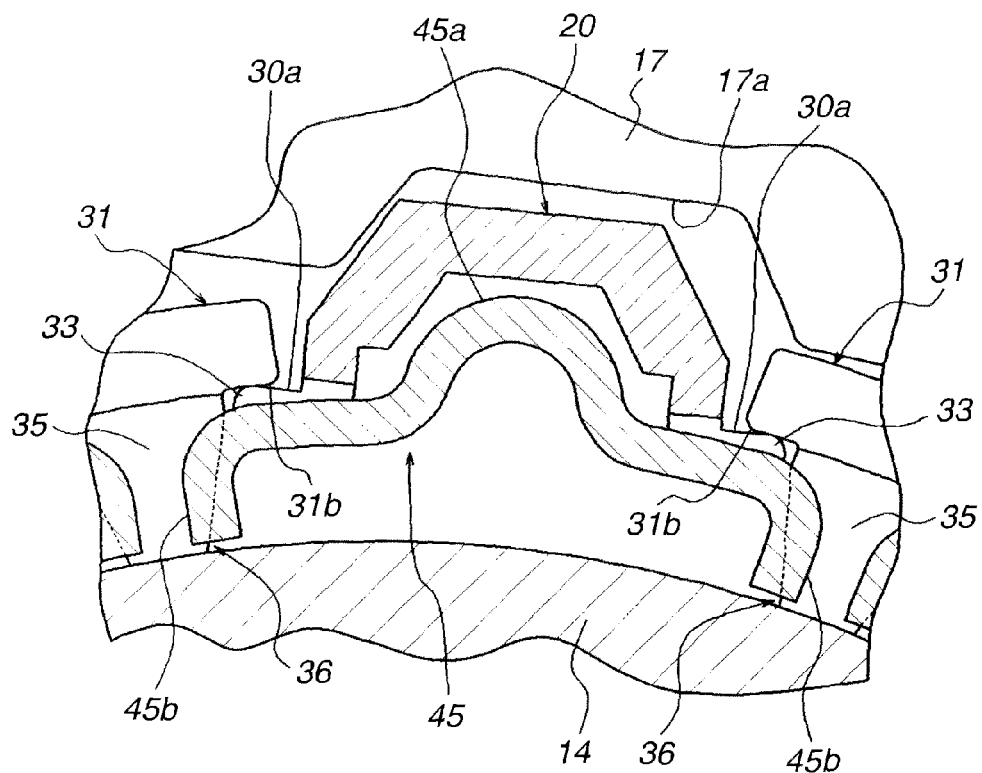
FIG. 24 An explanatory view partly showing a state where the movable tooth is held in the movable-teeth guide of FIG. 23, by an isometric projection.

FIG. 24 is an explanatory view partly showing a state where the moveable tooth is held in the moveable-teeth guide of FIG. 23, by an isometric projection. As shown in FIG. 24, each of the plurality of spring 45 includes one protrusion 45a in a center portion, and leg portions 45b in both ends portions of spring 45. The protrusion 45a is provided for being installed in the moveable tooth 30. Each leg portion 45b bends in a direction opposite to a protruding direction of protrusion 45a. The spring 45 is formed in a narrow plate shape. Roughly, the spring 45 has a shape obtained by dividing the ring-shaped spring 32 by protrusion 45a, i.e., a shape obtained by separating a portion of ring-shaped spring 32 including one protrusion 45a from the other portions of ring-shaped spring 32. That is, the number of installed springs 45 (for example, twelve springs are shown in FIG. 23) corresponds to the number of moveable teeth 30, as a means for applying biasing force individually to each moveable tooth 30.

Fifth Embodiment

A movable tooth in a movable teeth structure according to a fifth embodiment of the present invention includes a stopping portion which protrudes in the axial direction (pulley axial direction) of pulley shaft 14, instead of the stopping portion (see 16b of FIG. 5 in the first embodiment) which protrudes in the circumferential direction of shaft portion (pulley shaft) 14. The movable teeth according to the fifth embodiment are installed in a movable-teeth fixing component formed for this stopping portion. The other structures and operations according to the fifth embodiment are similar as those of the movable teeth structure according to the first embodiment.

Figure 25:
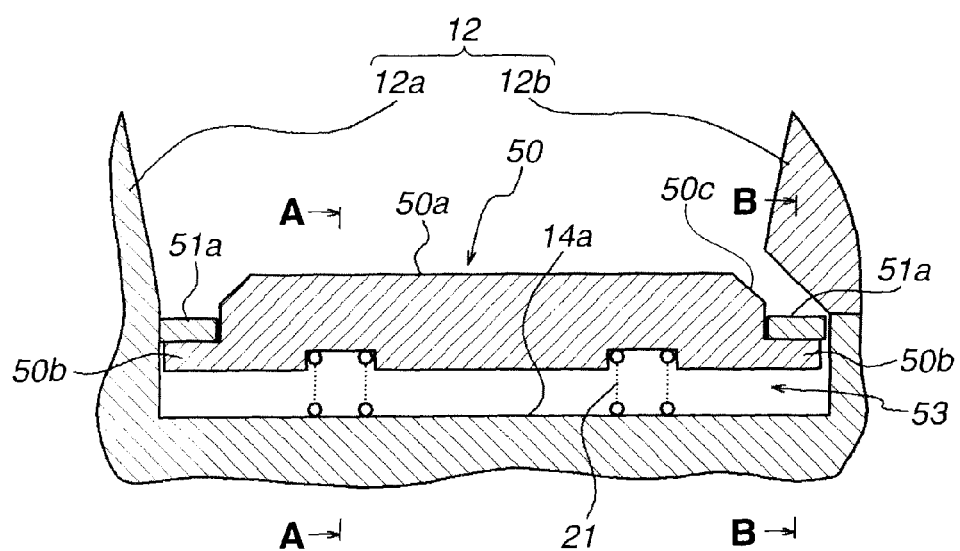
FIG. 25 An explanatory view showing a movable tooth in a movable teeth structure according to a fifth embodiment of the present invention, by using a cross section taken along the axial direction of shaft portion.

FIG. 25 is an explanatory view showing the movable tooth in the movable teeth structure according to the fifth embodiment of the present invention, by using a cross section taken along the axial direction of shaft portion. As shown in FIG. 25, the movable tooth 50 includes the stopping portions 50b, and inclined surfaces 50c. The stopping portion 50b protrudes from a protruding convex portion 50a in the axial direction of pulley, and protrudes outwardly in a flange shape. This protruding convex portion 50a is formed in a mound shape having a long lateral width. The inclined surface 50c is formed so as to cut or chamfer corners (edges) of entire circumference (four sides of rectangle) of upper surface of the protruding convex portion 50a.

This movable tooth 50 is installed in the movable-teeth fixing component 51 to be located between an outer surface 14a of shaft of driven pulley 12 and the movable-teeth fixing component 51, through the biasing members 21 such as coil springs. The biasing members 21 are disposed between the outer surface 14a and the movable tooth 50. When the movable tooth 50 is installed to the movable-teeth fixing component 51, the movable tooth 50 becomes in a state where both the stopping portions 50b and 50b are being stopped by a lower surface of an after-mentioned annular portions (ring portions) 51a of movable-teeth fixing component 51. The biasing members 21 are provided at two parts of movable tooth 50 which are located away from each other in the axial direction of pulley.

Figure 26:
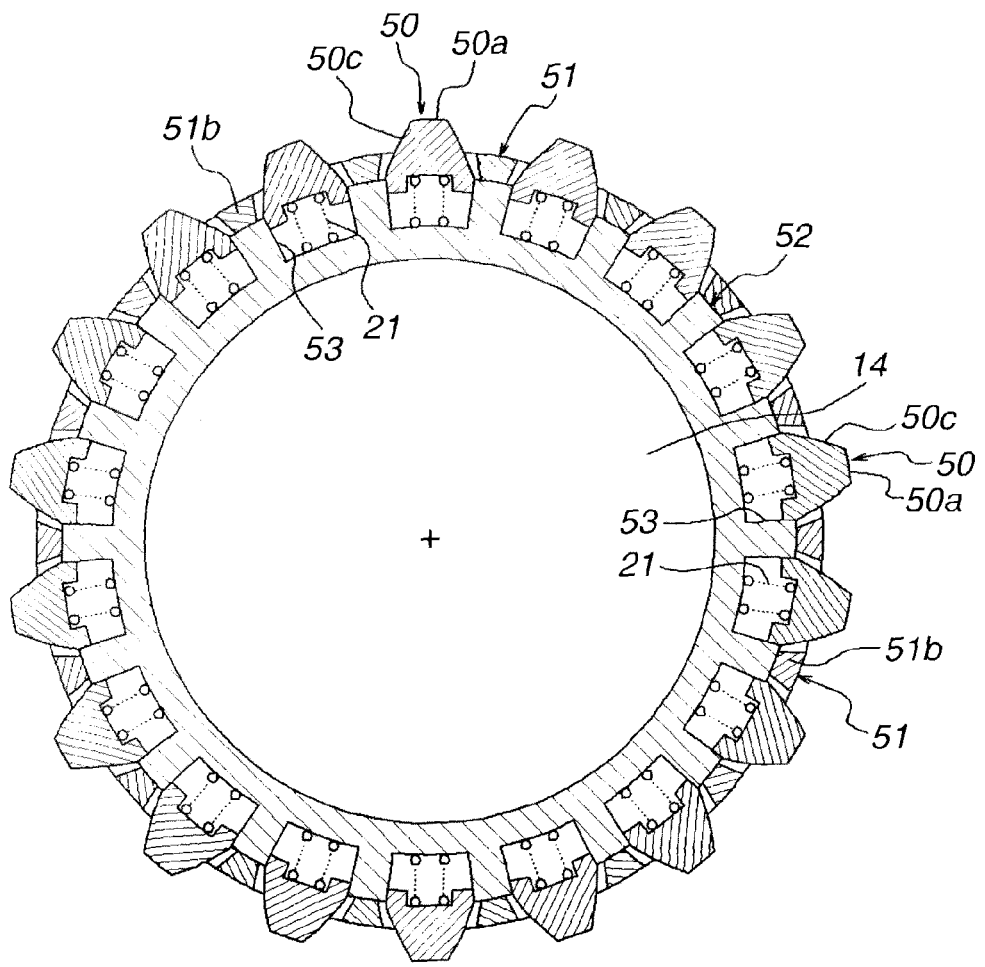
FIG. 26 A cross-sectional view according to the fifth embodiment, taken along a line A-A of FIG. 25.

FIG. 26 is a cross-sectional view according to the fifth embodiment, taken along a line A-A of FIG. 25. As shown in FIG. 26, each movable tooth 50 installed in the movable-teeth fixing component 51 causes an upper portion of protruding convex portion 50a which includes the inclined surfaces 50c, to protrude from an (radially-) outer surface of movable-teeth fixing component 51. At this time, an upward movement of movable tooth 50 is restricted because both the stopping portions 50b and 50b are stopped by the annular portions (protrusion restricting portions) 51a, so that the state where the upper portion of protruding convex portion 50a including the inclined surfaces 50c is protruding from the outer surface of movable-teeth fixing component 51 is maintained.

That is, both of the stopping portions 50b and 50b are provided to the protruding convex portion 50a, only in the axial direction of pulley shaft, except in the circumferential direction of pulley shaft. The protrusion of movable tooth 50 from the movable-teeth fixing component 51 is limited because both the stopping portions 50b and 50b are locked by the annular portions 51a.

Under the state where the movable tooth 50 installed in the movable-teeth fixing component 51 is protruding from the outer surface of movable-teeth fixing component 51; the movable tooth 50 has its protruding amount sufficient to engage with the concave portion 17a of chain 13 located at the bottom of V-groove of driven pulley 12, and also has its length in the axial direction of movable-teeth fixing component 51 which is sufficient to engage with the concave portion 17a.

Each movable tooth 50 is disposed in a groove portion 53 of a spacer 52, together with the biasing members 21 for biasing and supporting the movable tooth 50. The spacer 52 is formed in a shape of cylindrical tube. The spacer 52 is attached to the pulley shaft 14 by covering the outer circumferential surface of pulley shaft 14, under a state where the pulley shaft 14 is passing through the spacer 52 and has been integrated with the spacer 52. That is, a lower portion of the protruding convex portion 50a of each movable tooth 50 is brought into the groove portion 53 and thereby is engaged with the spacer 52. Hence, the movable teeth 50 are engaged through the spacer 52 formed with groove portions 53, with the pulley shaft 14 integrated with the spacer 52.

Each groove portion 53 opens over an entire-width range of outer surface of spacer 52 along the axial direction of pulley, to allow the movable tooth 50 to freely rise and escape from/to the groove portion 53. The groove portions 53 are arranged to be spaced at approximately equal intervals over an entire circumferential range of spacer 52 (i.e., are formed at circumferentially equal intervals in the entire circumference of spacer 52). That is, this groove portion 53 restricts a pulley-circumferential position of the movable tooth 50 disposed on the outer surface of pulley shaft 14. Although the groove portions 53 are formed in the outer surface of spacer 52 in the above example, according to this embodiment, the groove portions 53 may be formed directly in the outer surface of pulley shaft 14 without providing the spacer 52.

Figure 27:
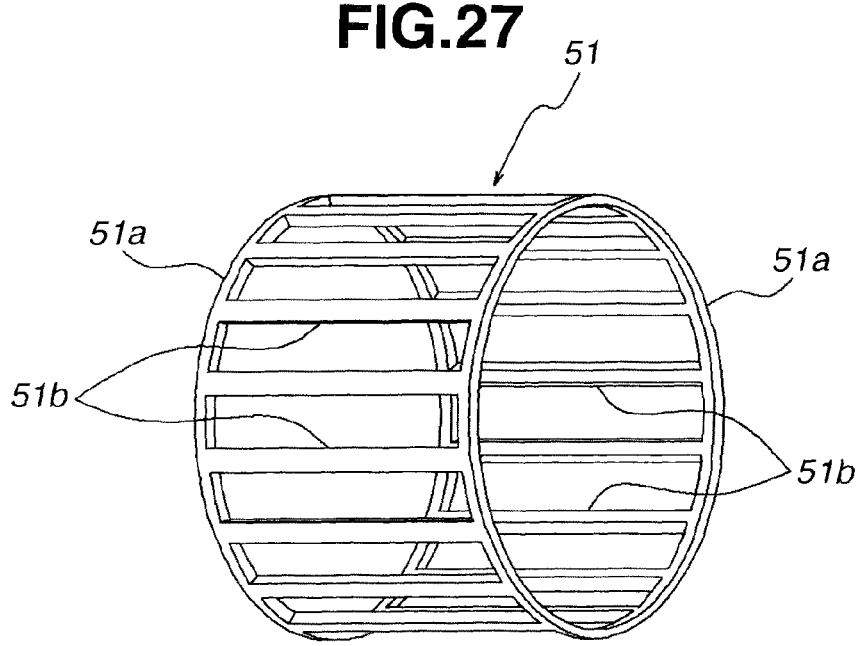
FIG. 27 An explanatory oblique perspective view showing a movable-teeth fixing component into which the movable tooth of FIG. 25 is installed.

FIG. 27 is an explanatory oblique perspective view showing the movable-teeth fixing component into which the movable tooth of FIG. 25 is installed. As shown in FIG. 27, the movable-teeth fixing component 51 is formed in a shape obtained by arranging a plurality of cross-member portions 51b substantially in parallel with one another between two annular (ring) portions 51a disposed laterally (to face each other). That is, the movable-teeth fixing component 51 looks as if a ladder has been deformed in a tubular shape by connecting both ends of ladder with each other. Each movable tooth 50 is installed between the adjacent cross-member portions 51b and 51b of movable-teeth fixing component 51, so that the movable teeth 50 can be positioned under the state where the movable teeth 50 are placed in a line at substantially equal intervals.

Figure 28:
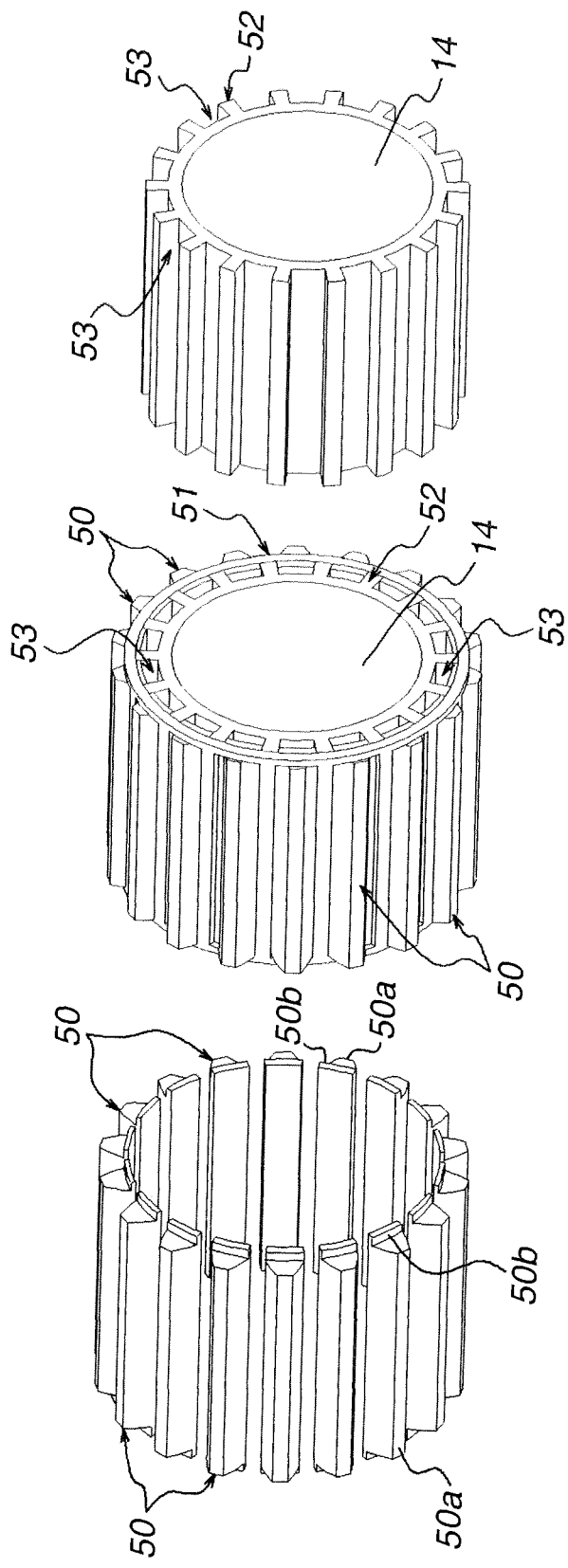
FIG. 28 An explanatory oblique perspective view showing a state where the movable teeth and the movable-teeth fixing component of FIG. 27 have been installed to the pulley shaft.

FIG. 28 is an explanatory oblique perspective view showing the state where the movable teeth and the movable-teeth fixing component of FIG. 27 have been installed to the pulley shaft. As shown in FIG. 28, each movable tooth (element) 50 is arranged between both annular portions 51a and 51a of movable-teeth fixing component (lock guide) 51 and between the cross-member portions 51b of movable-teeth fixing component 51, to attain the state where the movable teeth 50 are placed annularly in a line at substantially equal intervals. Then, the spacer 52 through which the pulley shaft 14 has passed is installed in the movable-teeth fixing component 51, under a state where the biasing members 21 (not shown in FIG. 28) are attached in the groove portions 53 so as to bias and hold the arranged movable teeth 50 by the biasing members 21. In the case that the groove portions 53 are formed directly in the pulley shaft 14, the pulley shaft 14 whose groove portions 53 are receiving the biasing members 21 is installed in the movable-teeth fixing component 51.

By the above structures, when the CVT 10 is in the setting for highest speed, the width of V-groove of driven pulley is broadened so that the chain 13 is located at the bottom of V-groove. When the winding radius at which the chain 13 winds around the driven pulley 12 is small, the chain 13 becomes in contact with the shaft portion of driven pulley 12 so that the concave portions 17a of chain 13 engage with the upper portions of movable teeth 50 which are protruding from between the annular portions 51a of movable-teeth fixing component 51 and between the cross-member portions 51b of movable-teeth fixing component 51.

The movable pulley 12b which slides in contact with the outer surface of pulley shaft 14 is configured to slide in contact with the outer surface of movable-teeth fixing component 51, as it is. At this time, the movable pulley 12b moves while pushing down the inclined surfaces 50c of upper portion of movable tooth 50 against the biasing force of biasing members 21. Hence, the movable teeth 50 protruding between the annular portions 51a and between the cross-member portions 51b escape underneath the annular portions 51a and the cross-member portions 51b, so that the movable teeth 50 do not interfere with the movement of movable pulley 12b.

As mentioned above, since the stopping portions 50b which are stopped by the annular portions 51a functioning as the protrusion restricting portions are provided to the protruding convex portion 50a only in the axial direction of pulley shaft except in the circumferential direction of pulley shaft, each movable tooth 50 does not includes the flange-shaped rib protruding from the protruding convex portion 50a in the circumferential direction of pulley shaft.

Thus, the stopping portions 50b are formed to protrude only in the axial direction of pulley in this fifth embodiment. Accordingly, a tooth width can be enlarged in the circumferential direction of pulley shaft as compared with the case that the stopping portions (16b of FIG. 5) are formed in the circumferential direction of pulley shaft as shown in the first embodiment, on the assumption that the teeth number of movable teeth 50 in the fifth embodiment is identical with that in the first embodiment. Hence, the strength of each tooth of the plurality of movable teeth 50 can be enhanced. Moreover, on the assumption that the tooth width of movable tooth 50 is identical, the number of teeth can be increased in this fifth embodiment. Accordingly, a torque share per one tooth among the plurality of movable teeth 50 can be reduced, so that the durability of movable teeth 50 can be improved.

Figure 29:
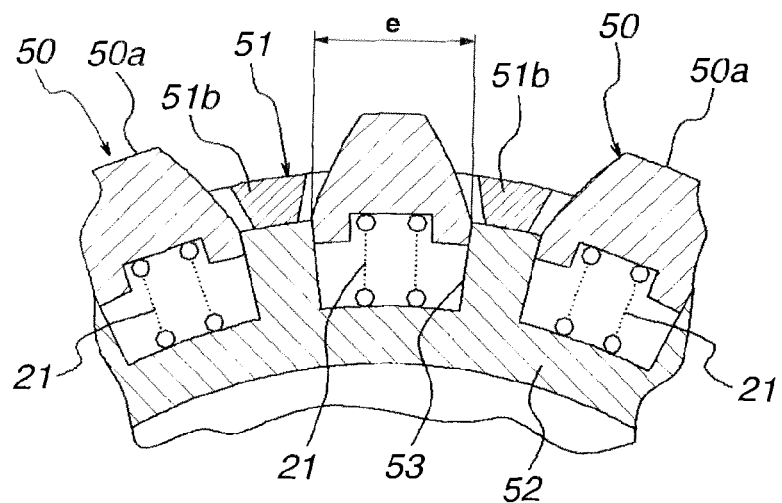
FIG. 29 An explanatory enlarged view showing a part of the movable-teeth mounting portion of FIG. 26.

FIG. 29 is an explanatory enlarged view showing a part of the movable-teeth mounting portion of FIG. 26. As shown in FIG. 29, the tooth width e of movable tooth 50 can be enlarged as far as (i.e., can occupy) an entire range of groove portion 53 in the circumferential direction of pulley shaft, as compared with the case that the flange-shaped ribs are provided to protrude from the protruding convex portion 50a in the circumferential direction of pulley shaft. By this enlarged amount of tooth width e, the strength of movable teeth 50 can be more enhanced.

Moreover, the movable teeth 50 are engaged through the spacer 52 including the groove portions 53, with the pulley shaft 14 (or directly with the pulley shaft 14 including its groove portions), in this embodiment. Hence, the driving force applied to the movable teeth 50 can be received by the pulley shaft 14. Therefore, a rigidity of the movable-teeth fixing component can be reduced while satisfying a lockup performance, as compared with the case that the driving force applied to the movable teeth 50 is received only by the movable-teeth fixing component for fixing the movable teeth 50.

That is, in the case that the driving force applied to the movable teeth 50 is received only by the movable-teeth fixing component for fixing the movable teeth 50, the rigidity of movable-teeth fixing component needs to be high in order to satisfy the lockup performance. In this case, if the rigidity of movable-teeth fixing component is low, for example, there is a possibility that the movable-teeth fixing component is deformed, furthermore in some instances, there is a risk that movable-teeth fixing component becomes unable to satisfy the lockup performance due to an occurrence of pitch deviation (shift).

Sixth Embodiment

A movable teeth structure according to a sixth embodiment of the present invention includes three stopping portions for restricting the upward movement of movable teeth, instead of providing two stopping portions. The other structures and operations of the movable teeth structure according to the sixth embodiment are similar as those according to the fifth embodiment.

Figure 30:
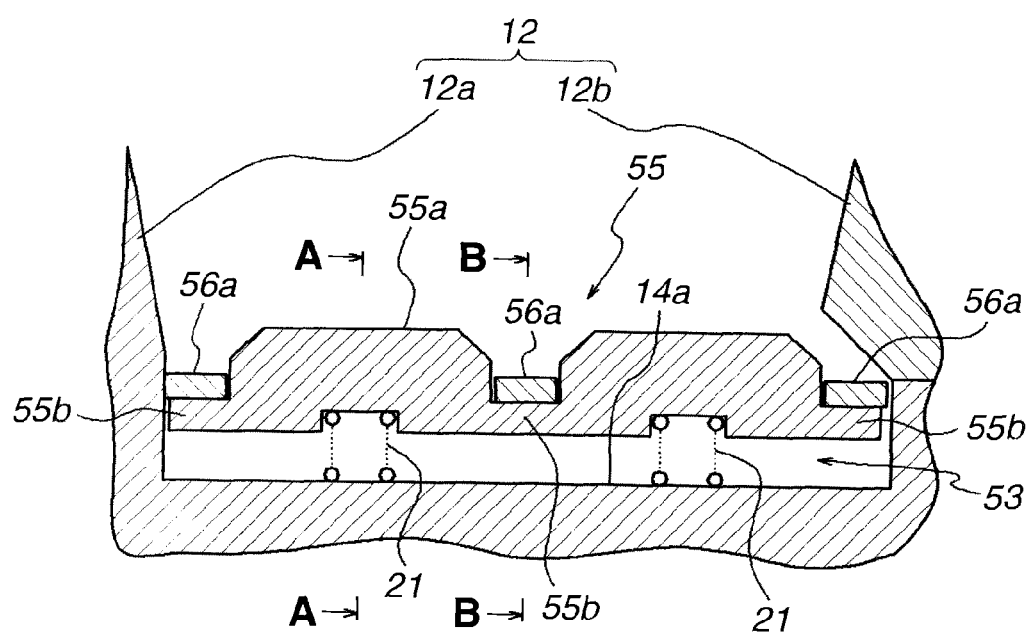
FIG. 30 An explanatory cross-sectional view showing a movable tooth in a movable teeth structure according to a sixth embodiment of the present invention, taken along the axial direction of pulley.
Figure 31:
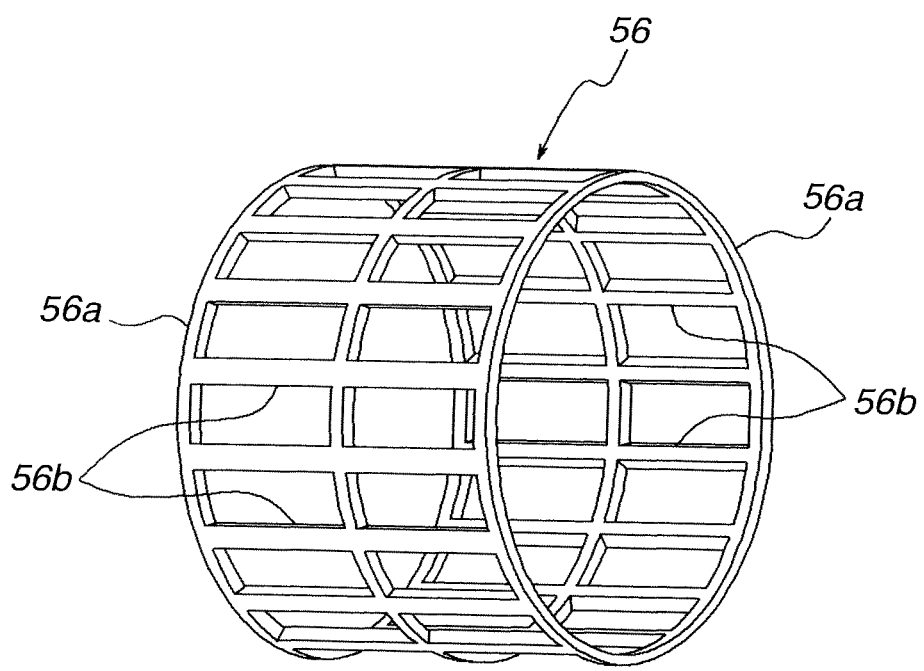
FIG. 31 An explanatory oblique perspective view showing a movable-teeth fixing component into which the movable teeth of FIG. 30 are installed.

FIG. 30 is an explanatory cross-sectional view showing a movable tooth of the movable teeth structure according to the sixth embodiment of present invention, taken along the axial direction of pulley. FIG. 31 is an explanatory oblique perspective view showing a movable-teeth fixing component into which the movable teeth of FIG. 30 are installed.

As shown in FIG. 30, the movable tooth 55 includes a stopping portion 55b at an approximately center portion of movable tooth 55 in the axial direction of pulley, in addition to the stopping portions 55b and 55b provided from protruding convex portions 55a in the axial direction. The stopping portions 55b which restrict the upward movement of movable teeth 55 are provided at three locations of the both sides of tooth and the almost center of tooth in the axial direction of pulley. The stopping portion 55b provided in the substantially center portion in the axial direction of pulley is formed in a groove shape capable of being stopped by an after-mentioned annular portion 56a of movable-teeth fixing component 56, in the same manner as the stopping portions 55b provided at the both sides of tooth in the pulley axial direction. That is, the stopping portion 55b located at the substantially center portion is formed in the groove shape including a bottom surface having a shape and a height identical with those of upper surface of each stopping portion 55b provided at the both sides of tooth in the pulley axial direction. The other structures and operations of movable teeth 55 are similar as those of the movable teeth 50.

Since the three stopping portions 55b are provided at three locations, the movable-teeth fixing component 56 includes three annular portions 56a corresponding to the three stopping portions 55b, as shown in FIG. 31. Moreover, the movable-teeth fixing component 56 includes a plurality of cross-member portions (ribs) 56b approximately in parallel with one another, between the three annular portions 56a. That is, the movable-teeth fixing component 56 is formed to dispose the plurality of cross-member portions 56b between two of the three annular portions 56a. The other structures and operations of movable-teeth fixing component 56 are similar as the movable-teeth fixing component 51.

Figure 32:
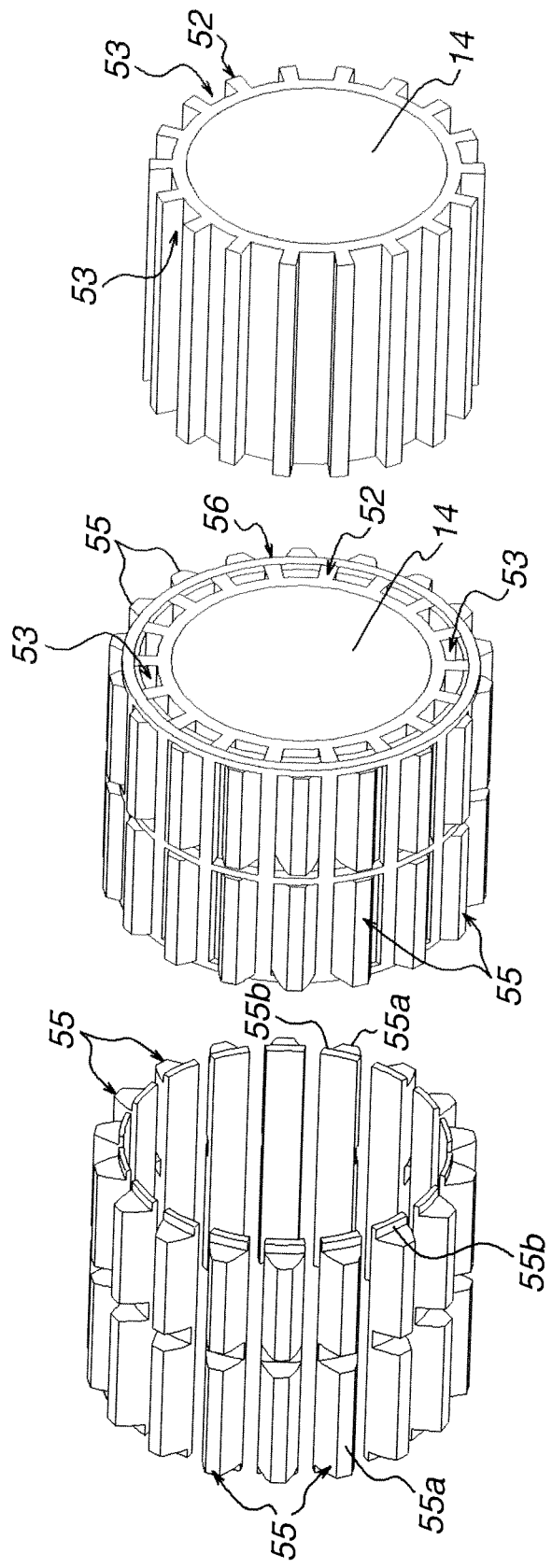
FIG. 32 An explanatory oblique perspective view showing a state where the movable teeth and the movable-teeth fixing component of FIG. 31 have been installed to the pulley shaft.

FIG. 32 is an explanatory oblique perspective view showing a state where the movable teeth and the movable-teeth fixing component of FIG. 31 have been installed to the pulley shaft. As shown in FIG. 32, each movable tooth (element) 55 is arranged between the cross-member portions 56b of movable-teeth fixing component 56, to attain the state where the respective movable teeth 55 are placed annularly in a line at substantially equal intervals. That is, the respective movable teeth 55 are disposed so as to locate the three annular portions 56a, 56a and 56a of movable-teeth fixing component (lock guide) 56 at both sides of movable teeth 55 and approximately at the center of movable teeth 55. Then, the spacer 52 through which the pulley shaft 14 has passed is installed in the movable-teeth fixing component 56, under a state where the biasing members 21 (not shown in FIG. 32) are attached in the groove portions 53 so as to bias and hold the arranged movable teeth 55 by the biasing members 21. In the case that the groove portions 53 are formed directly in the pulley shaft 14, the pulley shaft 14 whose groove portions 53 are receiving the biasing members 21 is installed in the movable-teeth fixing component 56.

Thus, the stopping portions 55b for restricting the protrusion caused by the upward movement of movable teeth 55 are provided at the plurality of locations given only in the axial direction of pulley (in this example, three locations of the both end portions and approximately center portion in the axial direction of pulley). By providing the stopping portion 55b also at the approximately center point of each movable tooth 55 in the axial direction of pulley, the annular portion 56a is located also at the substantially center point of movable tooth 55 in the axial direction of pulley. Hence, for example, even if one of the annular portions 56a located at the both sides of movable tooth 55 departs (deviates) from the movable tooth 55 due to an inclination of movable tooth 5 in the axial direction of pulley or due to a deformation of movable tooth 55 at the time of torque transmission, the protrusion of movable tooth 55 can be reliably suppressed.

Moreover, by providing the plurality of stopping portions 55b (in this example, three stopping portions 55b), a load of the biasing members 21 for biasing the movable teeth 55 can be distributed and thereby equalized, so that a sufficient strength of the movable-teeth fixing component 56 into which the movable teeth 55 are installed can be secured.

Seventh Embodiment

In movable teeth structures according to a seventh embodiment of the present invention, a stopping surface by which the stopping portion for restricting the protrusion of movable teeth is stopped by the annular portion of movable-teeth fixing component has a convex shape or a concave shape. The other structures and operations of the movable teeth structure according to the seventh embodiment are similar as those of the movable teeth structure according to the fifth embodiment.

Figure 33:
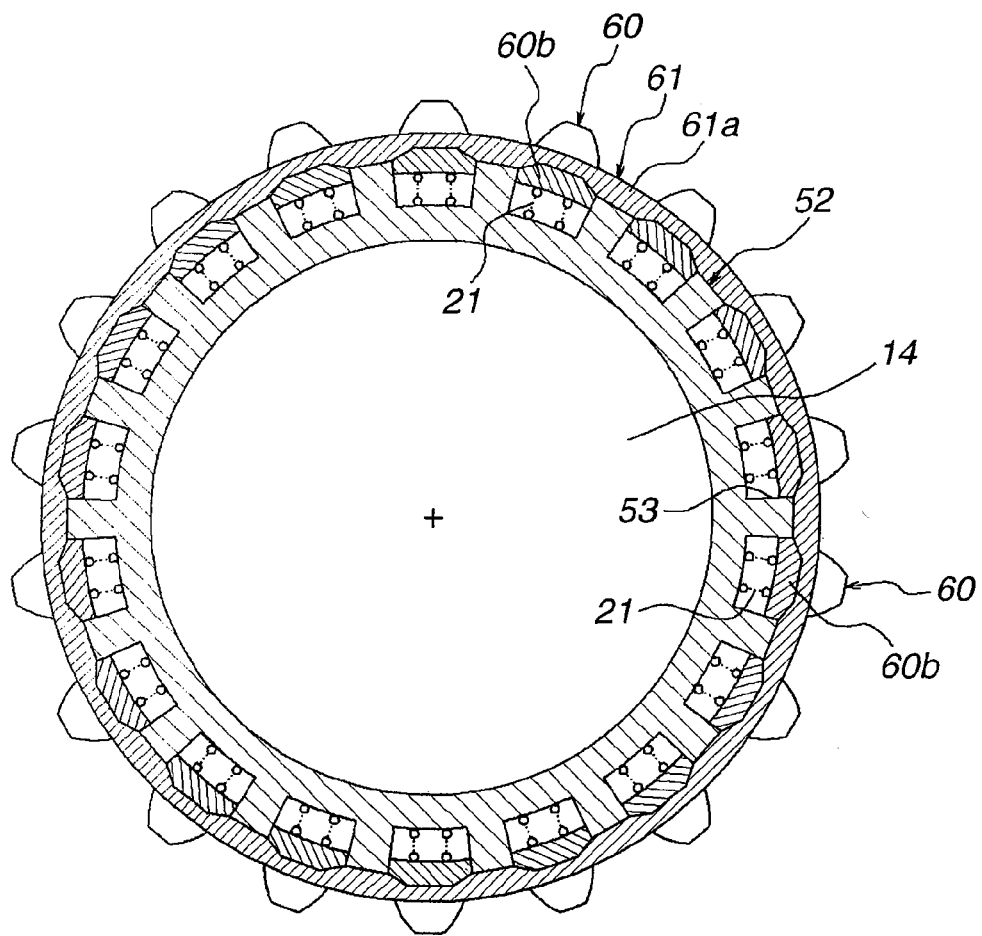
FIG. 33 A cross-sectional view explaining a (first) movable teeth structure according to a seventh embodiment of the present invention, taken along a line B-B of FIG. 25.
Figure 34:
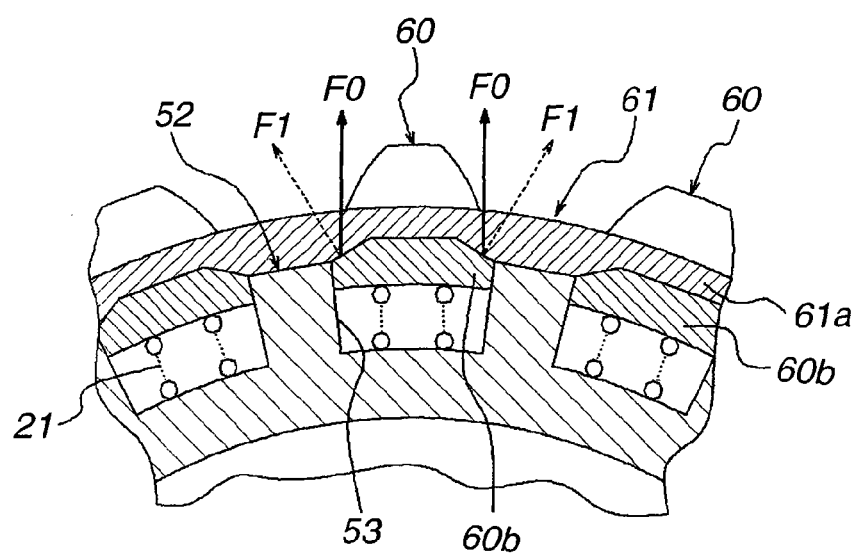
FIG. 34 An enlarged explanatory view showing a part of the movable-teeth mounting portion of FIG. 33.

FIG. 33 is a cross-sectional view explaining a (first) movable teeth structure according to the seventh embodiment of present invention, taken along a line B-B of FIG. 25. FIG. 34 is an enlarged explanatory view showing a part of the movable-teeth mounting portion of FIG. 33. As shown in FIG. 33, the stopping portion 60b for restricting the protrusion of movable tooth 60 is stopped by a lower surface of annular portion 61a of movable-teeth fixing component 61 from a lower direction of the annular portion 61a. An upper surface (stopping surface) of stopping portion 60b which is stopped by the annular portion 61a includes inclined surfaces defining a convex shape in the circumferential direction of outer surface of pulley shaft 14. That is, the upper surface of stopping portion 60b is formed in a mound shape in cross section taken in the circumferential direction of pulley shaft 14, as shown in FIG. 33. Moreover, the lower surface of the annular portion 61a includes inclined surfaces defining concave shapes in the circumferential direction of outer surface of pulley shaft 14. That is, the lower surface of annular portion 61a is formed in a dish shape in cross section taken in the circumferential direction of pulley shaft 14, so as to form dish-shaped receiving portions corresponding to the upper surfaces of stopping portions 60b.

By virtue of the above structure, when the biasing force of biasing members 21 is applied to the movable tooth 60 and thereby a load F0 is added to the upper surface (stopping surface) of stopping portion 60b for restricting the protrusion of movable tooth 60, a perpendicular (vertical) component force F1 is generated which presses the movable tooth 60 to the annular portion 61a of movable-teeth fixing component 61 through the upper surface of stopping portion 60b constituted by the inclined surfaces defining convex shape, as shown in FIG. 34. Accordingly, the movable tooth 60 can be prevented from being inclined in the circumferential direction of outer surface of pulley shaft 14.

Figure 35:
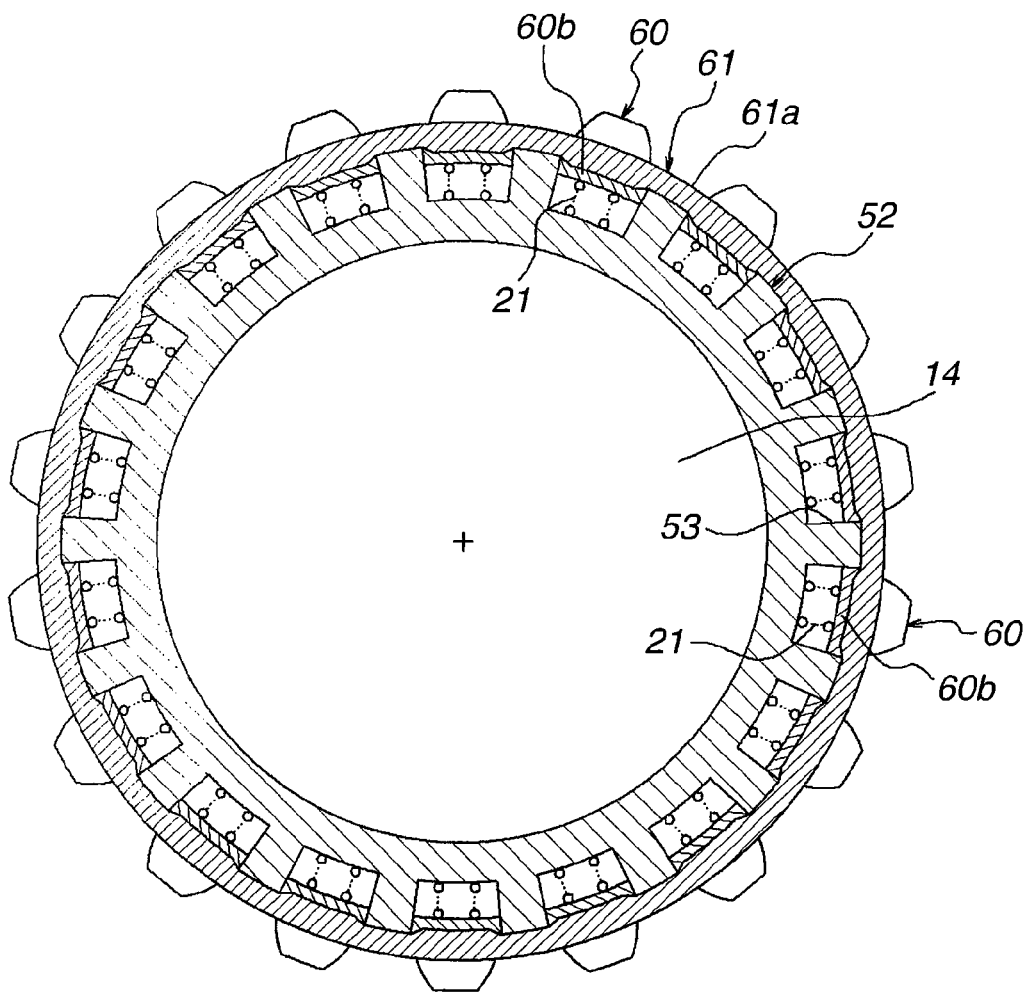
FIG. 35 A cross-sectional view explaining a (second) movable teeth structure according to the seventh embodiment of the present invention, taken along the line B-B of FIG. 25.
Figure 36:
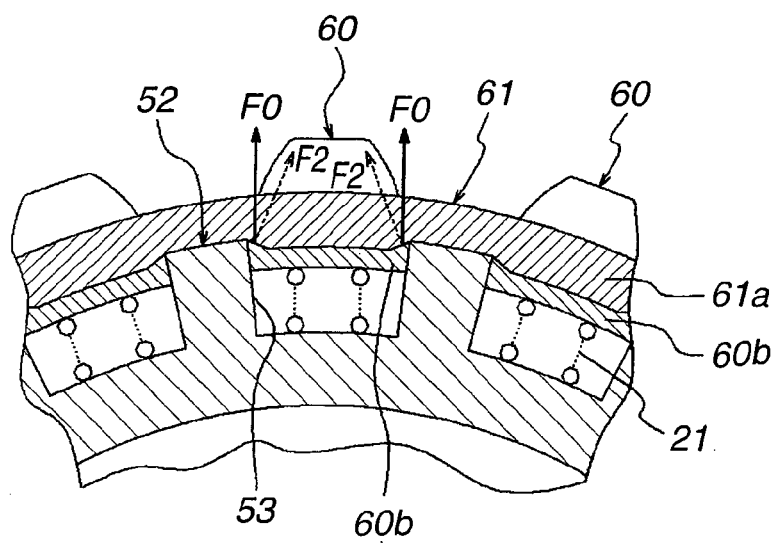
FIG. 36 An enlarged explanatory view showing a part of the movable-teeth mounting portion of FIG. 35.

FIG. 35 is a cross-sectional view explaining a (second) movable teeth structure according to the seventh embodiment of the present invention, taken along the line B-B of FIG. 25. FIG. 36 is an enlarged explanatory view showing a part of the movable-teeth mounting portion of FIG. 35. As shown in FIG. 35, the stopping portion 60b for restricting the protrusion of movable tooth 60 is stopped by a lower surface of annular portion 61a of movable-teeth fixing component 61 from a lower direction of the annular portion 61a. An upper surface (stopping surface) of stopping portion 60b which is stopped by the annular portion 61a includes inclined surfaces defining a concave shape in the circumferential direction of outer surface of pulley shaft 14. That is, the upper surface of stopping portion 60b is formed in a dish shape in cross section taken in the circumferential direction of pulley shaft 14, as shown in FIG. 35. Moreover, a lower surface of the annular portion 61a includes inclined surfaces defining convex shapes in the circumferential direction of outer surface of pulley shaft 14. That is, the lower surface of annular portion 61a is formed in a mound shape in cross section taken in the circumferential direction of pulley shaft 14, so as to form mound-shaped receiving portions corresponding to the upper surfaces of stopping portions 60b.

By virtue of the above structure, when the biasing force of biasing members 21 is applied to the movable tooth 60 and thereby the load F0 is added to the upper surface (stopping surface) of stopping portion 60b for restricting the protrusion of movable tooth 60, a perpendicular (vertical) component force F2 is generated which presses the movable tooth 60 to the annular portion 61a of movable-teeth fixing component 61 through the upper surface of stopping portion 60b constituted by the inclined surfaces defining concave shape, as shown in FIG. 36. Accordingly, the movable tooth 60 can be prevented from being inclined in the circumferential direction of outer surface of pulley shaft 14.

As described above, according to the present invention, a continuously variable transmission configured to transmit a rotational driving force of one pulley to another pulley by a driving-force transmitting means wound between the two pulleys, wherein each of the two pulleys is configured to vary a groove width thereof, is characterized in that the continuously variable transmission comprises: an engagement-receiving portion provided to the driving-force transmitting means, in a side of the driving-force transmitting means on which the driving-force transmitting means is wound on the pulleys; and a movable engaging portion provided to a shaft portion of at least one of the two pulleys, wherein the movable engaging portion is movable in a radial direction of the shaft portion to protrude from and escape into the shaft portion, wherein the movable engaging portion is configured to protrude from the shaft portion so as to engage with the engagement-receiving portion at least one of when a pulley-ratio region is in a setting for highest speed and when the pulley-ratio region is in a setting for lowest speed.

Moreover, according to the present invention, it is more preferable that the driving-force transmitting means becomes in contact with the shaft portion of the pulley to cause the movable engaging portion to engage with the engagement-receiving portion, when the driving-force transmitting means is located at a groove bottom of the pulley and thereby a pulley winding radius of the driving-force transmitting means is small.

Moreover, according to the present invention, it is more preferable that the movable engaging portion is configured to move in the radial direction of the shaft portion to generate a slope friction force between the driving-force transmitting means and the movable engaging portion and thereby to reduce a slip rate between the driving-force transmitting means and the pulley, when a pulley ratio between the two pulleys is larger than the setting for highest speed; and configured to sufficiently engage with the driving-force transmitting means such that the pulley and the driving-force transmitting means do not slip on each other or almost do not slip on each other, when the pulley ratio is in the setting for highest speed.

Moreover, according to the present invention, it is more preferable that a space is given between the movable engaging portion and a protrusion restricting portion for restricting a protrusion of the movable engaging portion, under a state where the movable engaging portion is engaging with the engagement-receiving portion; and the protrusion restricting portion is provided to the shaft portion.

Moreover, according to the present invention, it is more preferable that the movable engaging portion includes a stopping portion only in an axial direction of the pulley; and the stopping portion is configured to be stopped by a protrusion restricting portion for restricting a protrusion of the movable engaging portion, the protrusion restricting portion being provided to the shaft portion.

Moreover, according to the present invention, it is more preferable that a stopping surface of the stopping portion includes an inclined surface defining a convex shape or a concave shape.

Moreover, according to the present invention, it is more preferable that the driving-force transmitting means is a chain formed by connecting a plurality of chain links with one another in an annular shape by means of pins, and each of the plurality of chain links is rotatable about the pin.

Moreover, according to the present invention, it is more preferable that the engagement-receiving portion is a concave portion formed in the chain link, and the concave portion opens in a direction toward the movable engaging portion.

Moreover, according to the present invention, it is more preferable that the two pulleys are constituted by a drive pulley to which driving force is inputted, and a driven pulley to which the rotational driving force is transmitted from the drive pulley through the driving-force transmitting means.

Moreover, according to the present invention, it is more preferable that the movable engaging portion is biased to protrude outwardly in the radial direction of the shaft portion of the pulley, by a biasing member.

Moreover, according to the present invention, it is more preferable that the biasing member is a coil spring attached to each movable engaging portion and configured to expand and contract in the radial direction of the shaft portion of the pulley, and the coil spring is configured to protrude the movable engaging portion when the coil spring expands.

Moreover, according to the present invention, it is more preferable that the biasing member is a ring-shaped spring disposed in an outer circumference of the shaft portion of the pulley and configured to enlarge and reduce a diameter of the ring-shaped spring in the outer circumference of the shaft portion, and the ring-shaped spring is configured to integrally protrude a plurality of movable engaging portions disposed in the outer circumference of the shaft portion when the ring-shaped spring enlarges the diameter thereof.

Moreover, according to the present invention, it is more preferable that the ring-shaped spring includes a protrusion disposed inside each of the plurality of movable engaging portions, and the protrusion is arranged to give a clearance between the movable engaging portion and the protrusion, the clearance permitting the ring-shaped spring to be deformed by a biasing force.

Moreover, according to the present invention, it is more preferable that the ring-shaped spring includes a movement preventing portion configured to prevent a movement of the ring-shaped spring in a circumferential direction of the ring-shaped spring.

Moreover, according to the present invention, it is more preferable that the ring-shaped spring includes a non-connected portion cutting a part of the ring-shaped spring to separate the cut both ends in a circumferential direction of the ring-shaped spring, and the non-connected portions of a plurality of ring-shaped springs mounted to the movable engaging portions are arranged at locations displaced from one another among the plurality of ring-shaped springs.

Each of the above-described first to seventh embodiments is not limited to the above structures explained therein, and may appropriately employ the corresponding structures explained in the other embodiments in combination with own structures. As a matter of course, the continuously variable transmission according to the present invention involves such structures obtained by combining structures among the first to seventh embodiments.

What is claimed is:

1. A continuously variable transmission configured to transmit a rotational driving force of one pulley to another pulley by a driving-force transmitting medium wound between the two pulleys wherein each of the two pulleys is configured to vary a groove width thereof, the continuously variable transmission comprising:

an engagement-receiving portion provided to the driving-force transmitting medium on a side of the driving-force transmitting medium on which the driving-force transmitting medium is wound on the pulleys; and a movable engaging portion provided to a shaft portion of at least one of the two pulleys, wherein the movable engaging portion is movable in a radial direction of the shaft portion to protrude from and escape into the shaft portion, wherein the movable engaging portion is configured to protrude from the shaft portion to engage with the engagement-receiving portion at least one of when a pulley-ratio region is in a setting for highest speed and when the pulley-ratio region is in a setting for lowest speed, wherein the engagement-receiving portion is formed as a concave portion having an inclined surface, and the moveable engaging portion is formed with an inclined surface for contact with the inclined surface of the concave portion, wherein the movable engaging portion is configured to move in the radial direction of the shaft portion to generate a slope friction force between the inclined surface of the concave portion of the driving-force transmitting medium and the inclined surface of the moveable engaging portion to thereby reduce a slip rate between the driving-force transmitting medium and the at least one of the two pulleys, when a pulley-ratio region between the two pulleys is larger than the setting for highest speed, and wherein the movable engaging portion is configured to engage with the driving-force transmitting medium to prevent the at least one of the two pulleys and the driving-force transmitting medium from slipping on each other and/or from approaching slipping on each other, when the pulley-ratio region is in the setting for highest speed.

2. The continuously variable transmission as claimed in claim 1, wherein the driving-force transmitting medium contacts the shaft portion of the at least one of the two pulleys to cause the movable engaging portion to engage with the engagement-receiving portion, when the driving-force transmitting medium is located at a groove bottom of the at least one of the two pulleys and thereby a pulley winding radius of the driving-force transmitting medium is reduced.

3. The continuously variable transmission as claimed in claim 1, wherein a space is provided between the movable engaging portion and a protrusion restricting portion for restricting a protrusion of the movable engaging portion when the moveable engaging portion is engaging portion engages with the engagement-receiving portion, and wherein the protrusion restricting portion is provided to the shaft portion.

4. The continuously variable transmission as claimed in claim 1, wherein the movable engaging portion includes a stopping portion only in an axial direction of the at least one of the two pulleys, and wherein the stopping portion is configured to be stopped by a protrusion restricting portion for restricting a protrusion of the movable engaging portion, the protrusion restricting portion being provided to the shaft portion.

5. The continuously variable transmission as claimed in claim 4, wherein a stopping surface of the stopping portion includes an inclined surface defining a convex shape or a concave shape.

6. The continuously variable transmission as claimed in claim 1, wherein the driving-force transmitting medium is a chain formed by connecting a plurality of chain links in an annular shape using a plurality of corresponding pins, and wherein each of the plurality of chain links is rotatable about each of the pins.

7. The continuously variable transmission as claimed in claim 6, wherein the engagement-receiving portion is a concave portion formed in the chain, and the concave portion opens toward the movable engaging portion.

8. The continuously variable transmission as claimed in claim 1, wherein the two pulleys comprise a drive pulley to which driving force is inputted, and a driven pulley to which rotational driving force is transmitted from the drive pulley through the driving-force transmitting medium.

9. The continuously variable transmission as claimed in claim 1, wherein the movable engaging portion is biased to protrude outwardly in the radial direction of the shaft portion of the at least one of the two pulleys by a biasing member.

10. The continuously variable transmission as claimed in claim 9, wherein the biasing member is a coil spring attached to the movable engaging portion and configured to expand and contract in the radial direction of the shaft portion of the at least one of the two pulleys, and wherein the coil spring is configured to protrude the movable engaging portion when the coil spring expands.

11. The continuously variable transmission as claimed in claim 9, wherein the biasing member is a ring-shaped spring disposed in an outer circumference of the shaft portion of the at least one of the two pulleys and configured to enlarge and reduce a diameter of the ring-shaped spring in the outer circumference of the shaft portion, and the ring-shaped spring is configured to integrally protrude a plurality of movable engaging portions disposed in the outer circumference of the shaft portion when the ring-shaped spring enlarges the diameter thereof.

12. The continuously variable transmission as claimed in claim 11, wherein the ring-shaped spring includes a protrusion disposed inside each of the plurality of movable engaging portions, and the protrusion is arranged to give a clearance between the movable engaging portion and the protrusion, the clearance permitting the ring-shaped spring to be deformed by a biasing force.

13. The continuously variable transmission as claimed in claim 11, wherein the ring-shaped spring includes a movement preventing portion configured to prevent a movement of the ring-shaped spring in a circumferential direction of the ring-shaped spring.

14. The continuously variable transmission as claimed in claim 11, wherein the ring-shaped spring includes a non-connected portion cutting a part of the ring-shaped spring to separate the cut both ends in a circumferential direction of the ring-shaped spring, and the non-connected portions of a plurality of ring-shaped springs mounted to the movable engaging portions are arranged at locations displaced from one another among the plurality of ring-shaped springs.

* * * * *